(12) United States Patent
Simon et al.

(10) Patent No.: US 11,316,660 B2
(45) Date of Patent: Apr. 26, 2022

(54) MULTI-STAGE SECURE SMART CONTRACTS

(71) Applicant: Red Hat, Inc., Raleigh, NC (US)

(72) Inventors: Axel Simon, Paris (FR); Michael H. M. Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 293 days.

(21) Appl. No.: 16/282,052

(22) Filed: Feb. 21, 2019

(65) Prior Publication Data
US 2020/0274692 A1  Aug. 27, 2020

(51) Int. Cl.
*H04L 29/06* (2006.01)
*H04L 9/06* (2006.01)

(52) U.S. Cl.
CPC ........ *H04L 9/0631* (2013.01); *H04L 63/0442* (2013.01); *H04L 2209/38* (2013.01)

(58) Field of Classification Search
CPC ............... H04L 9/0631; H04L 63/0442; H04L 2209/38
See application file for complete search history.

(56) References Cited

U.S. PATENT DOCUMENTS

| | | | |
|---|---|---|---|
| 10,026,118 | B2 | 7/2018 | Castinado et al. |
| 10,601,585 | B1 | 3/2020 | Robinson et al. |
| 2002/0112171 | A1 | 8/2002 | Ginter et al. |
| 2012/0259759 | A1 | 10/2012 | Crist et al. |
| 2013/0121490 | A1 | 5/2013 | Boliek et al. |
| 2013/0232339 | A1* | 9/2013 | Ignatchenko ......... H04L 9/0825 713/171 |
| 2015/0256336 | A1 | 9/2015 | Stiglic et al. |
| 2017/0085545 | A1 | 3/2017 | Lohe et al. |

(Continued)

FOREIGN PATENT DOCUMENTS

| | | |
|---|---|---|
| WO | 2016063092 A1 | 4/2016 |
| WO | 2017127620 A1 | 7/2017 |

(Continued)

OTHER PUBLICATIONS

Author Unknown, "Oraclize Documentation," docs.oraclize.it/#home, accessed on Jul. 26, 2018, 29 pages.

(Continued)

*Primary Examiner* — Shin-Hon (Eric) Chen
(74) *Attorney, Agent, or Firm* — Withrow & Terranova, PLLC

(57) ABSTRACT

Encrypted multi-stage smart contracts are disclosed. A smart contract that is to be performed by a contract executor in a plurality of successive stages is generated. For each respective stage of at least some stages, a package of data is encrypted with at least one key to generate an encrypted package that corresponds to the respective stage, and an envelope that corresponds to the respective stage is generated. The envelope includes a condition precedent confirmable by an oracle, and an encrypted package-decryption key that is encrypted with a key of the contract executor. The encrypted package-decryption key, when decrypted, is configured to facilitate the decryption of the encrypted package that corresponds to the respective stage. For at least some of the stages, the encrypted package comprises an envelope and an encrypted package that corresponds to a next successive stage.

20 Claims, 18 Drawing Sheets

(56) References Cited

U.S. PATENT DOCUMENTS

| | | | |
|---|---|---|---|
| 2017/0287068 A1 | 10/2017 | Nugent | |
| 2018/0089758 A1 | 3/2018 | Stradling et al. | |
| 2018/0094953 A1 | 4/2018 | Colson et al. | |
| 2018/0097783 A1 | 4/2018 | Haldenby et al. | |
| 2018/0123804 A1* | 5/2018 | Smith | G06F 21/33 |
| 2018/0191503 A1 | 7/2018 | Alwar et al. | |
| 2018/0218176 A1 | 8/2018 | Voorhees et al. | |
| 2018/0227118 A1 | 8/2018 | Bibera et al. | |
| 2019/0035014 A1* | 1/2019 | Bell | H04L 9/0637 |
| 2019/0114706 A1 | 4/2019 | Bell et al. | |
| 2019/0158275 A1 | 5/2019 | Beck | |
| 2019/0220831 A1* | 7/2019 | Rangarajan | H04L 9/0869 |
| 2020/0059454 A1 | 2/2020 | Yang et al. | |
| 2020/0143337 A1* | 5/2020 | Conroy | G06Q 20/3829 |
| 2020/0162252 A1 | 5/2020 | Davis et al. | |
| 2020/0175590 A1 | 6/2020 | Huo | |
| 2020/0374272 A1 | 11/2020 | Zhang et al. | |
| 2020/0396079 A1 | 12/2020 | Dekant et al. | |
| 2020/0401734 A1 | 12/2020 | Murdoch et al. | |
| 2021/0035090 A1* | 2/2021 | Iannaccone | G06Q 10/101 |
| 2021/0194890 A1* | 6/2021 | Mohalik | G06F 21/645 |

FOREIGN PATENT DOCUMENTS

| | | |
|---|---|---|
| WO | 2018058105 A1 | 3/2018 |
| WO | 2018224431 A1 | 12/2018 |

OTHER PUBLICATIONS

Author Unknown, "Is it possible to make a contract with an encrypted payload," Reddit thread, reddit.com/r/ethereum/comments/4kd77q/is_it_possible_to_make_a_contract_with_an/, accessed on Aug. 1, 2018, 4 pages.

Author Unknown, "Encrypted Queries: Private Data on a Public Blockchain," blog.oraclize.it/encrypted-queries-private-data-on-a-public-blockchain-71d893fac2bf, accessed on Jul. 26, 2018, 8 pages.

Bertani, Thomas, "Understanding oracles," Oraclize, blog.oraclize.it/understanding-oracles-99055c9c9f7b, Feb. 18, 2016, 5 pages.

Hertig, Alyssa, "How Ethereum Works," www.coindesk.com/information/how-ethereum-works, accessed Dec. 7, 2018, 5 pages.

Lin, Connor, et al., "A Price-Stable Cryptocurrency for Next-Generation Payments," Carbon, Version 1.0.0, Apr. 3, 2018, 21 pages.

Linder, Peter, "Decryption Contract Enforcement Tool (Decent): A Practical Alternative to Government Decryption Backdoors," Technology Brief, Version 1.0, Mar. 31, 2016, IACR, 20 pages.

Mik, Eliza, "Smart contracts: Terminology, technical limitations and real world complexity," Law, Innovation and Technology, vol. 9, Issue 2, Oct. 2017, Research Collection School of Law, 27 pages.

Zhang, Fan, et al., "Town Crier: An Authenticated Data Feed for Smart Contracts," ACM Conference on Computer and Communications Security, Oct. 2016, Vienna, Austria, ACM, 20 pages.

Cardoso, Jose, "Blockchain and Smart Contracts for the Internet of Things—an Architecture for Sensor Data Availability," LISBOA 2018, 90 pages.

Curran, Brian, "What are Oracles? Smart Contracts, Chainlink & 'The Oracle Problem'," Sep. 19, 2018, blockonomi.com/oracles-guide/, Kooc Media Ltd., 13 pages.

Shrier, Allison, et al., "Blockchain and Health IT: Algorithms, Privacy, and Data," White Paper, Aug. 8, 2016, 166 pages.

Ellis, S. et al., "ChainLink: A Decentralized Oracle Network," V1.0, Sep. 4, 2017, 38 pages.

Non-Final Office Action for U.S. Appl. No. 16/252,008, dated Feb. 3, 2021, 29 pages.

Non-Final Office Action for U.S. Appl. No. 16/252,008, dated Jul. 29, 2021, 33 pages.

Non-Final Office Action for U.S. Appl. No. 16/252,068, dated Mar. 2, 2021, 25 pages.

Notice of Allowance for U.S. Appl. No. 16/252,068, dated Jul. 21, 2021, 10 pages.

Non-Final Office Action for U.S. Appl. No. 16/510,453, dated Aug. 31, 2021, 9 pages.

Non-Final Office Action for U.S. Appl. No. 16/252,008, dated Jan. 24, 2022, 26 pages.

Final Office Action and Examiner-Initiated Interview Summary for U.S. Appl. No. 16/510,453, dated Mar. 4, 2022, 12 pages.

* cited by examiner

MULTI-STAGE SECURE SMART CONTRACTS

BACKGROUND

Smart contracts, such as smart contracts provided by distributed ledger networks, are self-executing computer code containing logic that enables actions to be automatically performed upon satisfaction of one or more conditions precedent specified by a policy of the smart contract.

SUMMARY

The examples implement mechanisms for forming a multi-stage smart contract. For at least some of the stages, the smart contract includes an encrypted package that identifies the next successive stage. The keys to decrypt the encrypted package are provided to a contract executor only upon satisfaction of one or more conditions precedent of the current stage, such that the contract executor does not have access to the information in the next successive stage unless the conditions precedent of the current stage are satisfied. In this manner, the contract executor is not exposed to sensitive information that pertains to successive stages unless and until each previous stage is performed.

In one example, a method is provided. The method includes generating a smart contract that is to be performed by a contract executor in a plurality of successive stages, by, for each respective stage of at least some stages, encrypting a package of data with at least one key to generate an encrypted package that corresponds to the respective stage and generating an envelope that corresponds to the respective stage, the envelope comprising a condition precedent confirmable by an oracle, and an encrypted package-decryption key that is encrypted with a key of the contract executor, the encrypted package-decryption key, when decrypted, being configured to facilitate the decryption of the encrypted package that corresponds to the respective stage, wherein the encrypted package for at least some of the stages comprises an envelope and an encrypted package that corresponds to a next successive stage. The method further includes sending the smart contract to the contract executor.

Corresponding computing systems and computer readable mediums are also provided.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
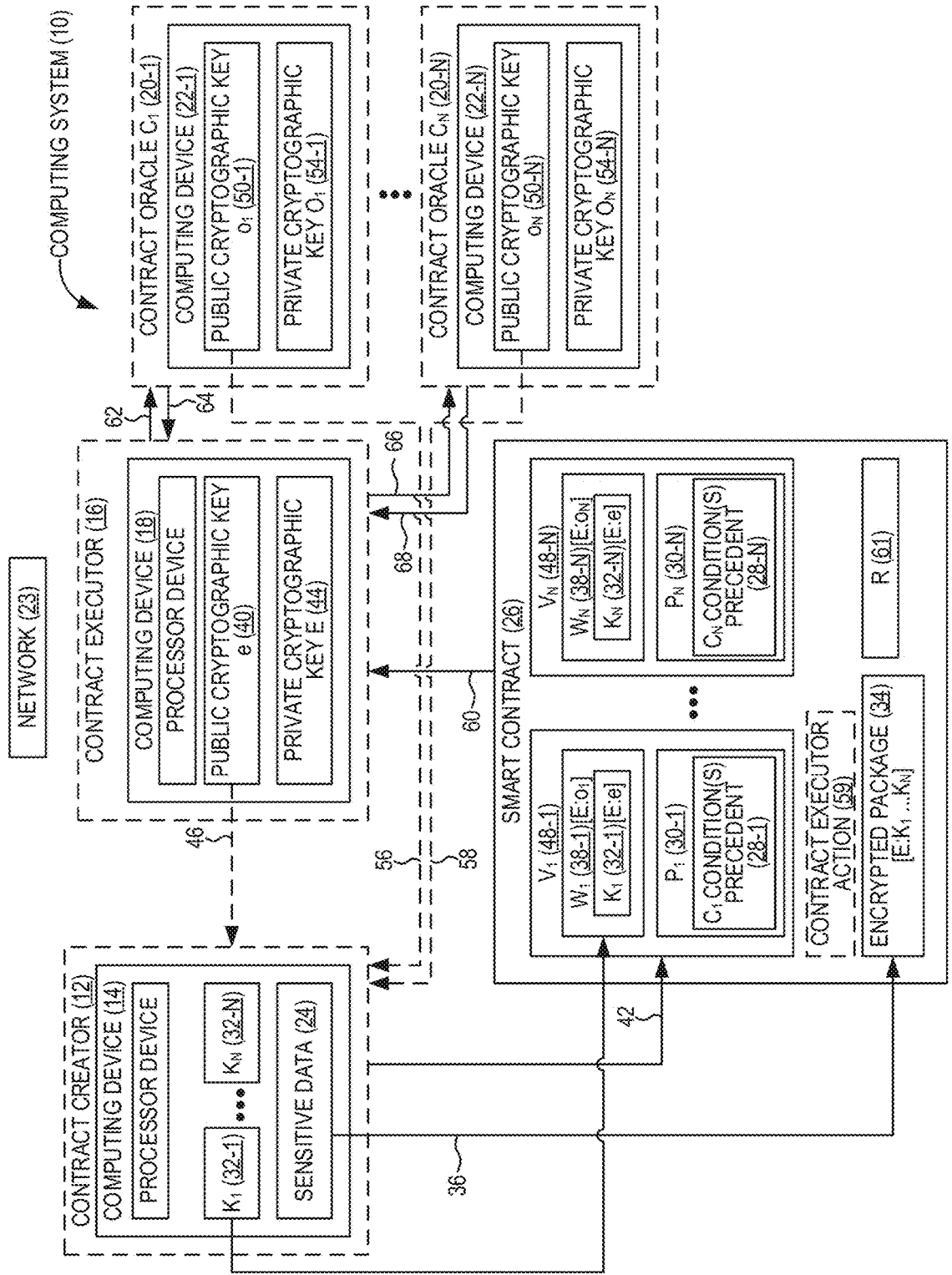
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first computing device" and "second computing device," and does not imply a priority, a type, an importance, or other attribute, unless otherwise stated herein. As used herein and in the claims, the articles "a" and "an" in reference to an element refers to "one or more" of the element unless otherwise explicitly specified. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A smart contract is executable computer code that specifies actions to be taken, or to occur, to implement a contract between two or more entities. A smart contract may be implemented by one or more electronic contract executors (which, in some examples, may be implemented in a computing node of a distributed ledger network). A contract executor automatically carries out the terms of the smart contract by performing one or more actions specified by the smart contract. A smart contract can thereby facilitate automatic verification and performance of an agreement or transaction between multiple parties. Smart contract functionality may be provided by a distributed ledger network, such as the blockchain-based Bitcoin, Ethereum, and Litecoin distributed ledger networks.

For some smart contracts, external data only available from sources external to the contract executor may be required to determine whether or not actions identified in the smart contract should be taken. The contract executor may gain access to such external data via a third party agent referred to as an "oracle." The oracle may be configured to access any type of data, such as (but not limited to) weather conditions, account balances, and/or current or historical prices of commodities, goods, and/or services. Upon request by the contract executor, the oracle may access such external data and, for example, confirm to the contract executor that some condition precedent has been met, or may provide the contract executor external data via which the contract executor can determine whether a condition precedent has been met.

Many smart contracts may require the contract executor to provide sensitive data in order to perform actions specified by the smart contract when the action is ready to be performed, such as when one or more condition(s) precedent have been satisfied. For instance, a smart contract may specify that, if and when the price of a given stock falls below a specified price, the contract executor is to automatically perform a stock purchase operation. The stock purchase operation may require a user identifier and password of an account holder for authentication and security purposes. However, it may be undesirable to store the user identifier and password within the smart contract itself, as such sensitive data may be exposed if the smart contract is malicious, has been compromised, or has been inspected by one capable of interpreting the content of a smart contract. Additionally, in examples where execution of the smart contract is based on data received from multiple oracles, it may be desirable for the smart contract to be executed only after the receipt of information from some subset (e.g., more than half, as a non-limiting example) of the oracles. Finally, it may be desirable to implement a smart contract in multiple stages, wherein the contract executor cannot access the actions to be performed and conditions precedent to be met associated with a next successive stage until the previous stage has been performed.

The examples disclosed herein address these issues via the generation of a smart contract that is to be performed in multiple successive stages. For at least some of the stages, the contract creator uses a key of the contract creator to create an encrypted package that contains the actions and/or conditions precedent for a next successive stage. The contract creator encrypts the key that is needed to decrypt the encrypted package using a public key of a contract executor to generate an encrypted key. The contract executor then encrypts a wrapper containing the encrypted key using a public key of an oracle to generate an encrypted wrapper. The oracle, in response to external data or in response to performing some action, decrypts the encrypted wrapper using a private key of the oracle to generate a decrypted wrapper, and provides the decrypted wrapper to the contract executor. The contract executor then decrypts the encrypted key using a private key of the contract executor to generate a decrypted key. The contract executor then uses the decrypted key to decrypt an encrypted package that contains the actions and/or conditions precedent for a next successive stage of the smart contract.

In some examples, for one or more stages of the multi-stage smart contract, the contract executor uses a threshold cryptosystem (e.g., the Shamir's Secret Sharing cryptosystem, as a non-limiting example) to encrypt the encrypted package necessary for executing the next stage using a number N of symmetric cryptographic keys $K_1$-$K_N$, (hereinafter "symmetric keys" or "keys" for the sake of brevity) where N>1, such that a subset of at least size R (where $1 \leq R \leq N$) of the symmetric keys $K_1$-$K_N$ is required to decrypt the encrypted package. The contract creator then encrypts the symmetric keys $K_1$-$K_N$ to generate a corresponding plurality of encrypted keys $K_1$-$K_N$ using a public key e of a contract executor, where the public key e corresponds to a private key E of the contract executor. Next, the contract creator encrypts the encrypted keys $K_1$-$K_N$ using corresponding public keys $o_1$-$o_N$ of a plurality of oracles $C_1$-$C_N$, where each of the public keys $o_1$-$o_N$ corresponds to a private key $O_1$-$O_N$ of the respective oracle $C_1$-$C_N$, to generate a plurality of encrypted wrappers $W_1$-$W_N$.

The contract creator creates a plurality of envelopes $V_1$-$V_N$ that each include a corresponding respective encrypted wrapper $W_1$-$W_N$, as well as a policy $P_1$-$P_N$ that specifies one or more conditions precedent to be confirmed by a corresponding oracle $C_1$-$C_N$. Each policy $P_1$-$P_N$ may be digitally authenticated (but not necessarily encrypted) using the public key $o_1$-$o_N$ of the corresponding oracle $C_1$-$C_N$ that will confirm the conditions precedent identified by the policy $P_1$-$P_N$. The smart contract is then deployed to the contract executor. The sensitive data required to execute the smart contract thus may be provided in a secure form within the smart contract itself such that the contract executor is able to view the sensitive data for a next successive stage only if the appropriate actions and/or conditions precedent have occurred for the current stage.

FIG. 1 is a block diagram of a computing system 10 that is configured to provide smart contracts including secrets, in the form of an encrypted package, encrypted with oracle-provided encryption keys using threshold cryptosystems. However, it should be noted that the multi-stage smart contracts discussed herein, such as the multi-stage smart contract illustrated in FIG. 2, need not utilize a threshold cryptosystem, and may utilize a single symmetric key.

The computing system 10 of FIG. 1 includes a contract creator 12 comprising a computing device 14, a contract executor 16 comprising a computing device 18, and a plurality of oracles 20-1-20-N comprising respective computing devices 22-1-22-N. In some examples, the contract executor 16 may comprise a node of a distributed ledger network (e.g., a Bitcoin, Litecoin, or Ethereum distributed ledger network, as non-limiting examples) that maintains a local copy of a distributed ledger (e.g., a blockchain, as a non-limiting example). The contract creator 12, the contract executor 16, and the oracles 20-1-20-N ("$C_1$-$C_N$") are each communicatively coupled to the others via a network 23.

The contract creator 12 in the example of FIG. 1 maintains a package of data, referred to herein as sensitive data 24, which represents any suitable sensitive data, such as, by way of non-limiting example, data required to carry out an operation to be performed by a smart contract 26 upon the occurrence of one or more conditions precedent 28-1-28-N of a plurality of policies 30-1-30-N ("$P_1$-$P_N$") (generally, policies 30) of the smart contract 26. Each of the plurality of policies 30-1-30-N corresponds to an oracle 20 of the oracles 20-1-20-N, and, in some examples, the conditions precedent 28-1-28-N of the plurality of policies 30-1-30-N may be unique to the respective oracles 20-1-20-N. The conditions precedent 28-1-28-N are conditions that can be confirmed as being satisfied by the respective oracles 20-1-20-N. In some examples, the conditions precedent 28-1-28-N may be actions that are performed by the respective oracles 20-1-20-N. After performing the action, the corresponding oracles 20-1-20-N can confirm that such actions have been performed.

According to some examples, the sensitive data 24 may comprise a cryptographic key or other authentication information for authenticating an identity of a user of the contract creator 12 and/or for authorizing an operation on behalf of a user of the contract creator 12, as non-limiting examples. As will be discussed in greater detail with regard to FIG. 2, in some examples the sensitive data 24 may comprise additional policies 30 and other information for performing subsequent stages of a multi-stage smart contract which can be accessed only after certain actions by one or more oracles 20.

To maintain the secrecy of the sensitive data 24 directly within the smart contract 26, the contract creator 12 generates a plurality of symmetric keys 32-1-32-N ("$K_1$-$K_N$"), and uses the symmetric keys 32-1-32-N to encrypt the sensitive data 24 as an encrypted package 34, as indicated by arrow 36. In some examples, encryption of the sensitive data 24 using the symmetric keys 32-1-32-N is performed according to a threshold cryptosystem that requires a specified subset of at least size R (where 1≤R≤N) of the symmetric keys 32-1-32-N to decrypt the encrypted package 34. Some examples may provide that the threshold cryptosystem is the Shamir's Secret Sharing cryptosystem, as a non-limiting example.

Each of the symmetric keys 32-1-32-N are then encrypted using a public key e 40 of the contract executor 16. Arrow 42 of FIG. 1 indicates the encryption of the symmetric key 32-1 ("$K_1$"), and it is to be understood that other symmetric keys 32-2-32-N are similarly encrypted using the public key e 40 of the contract executor 16. For purposes of illustration and clarity, throughout the drawings, data that is encrypted may be denoted in square brackets and the letter "E" followed by a colon ":" and the identity of the encryption key via which the respective data is encrypted. As an example, the symmetric key 32-1 ("$K_1$") is indicated as being encrypted with the public key e 40 of the contract executor 16 via the designation "[E:e]".

The public key e 40 of the contract executor 16 corresponds to a private key E 44 of the contract executor 16, and, in some examples, may be obtained by the contract creator 12 from the contract executor 16, a public encryption key registry, or some other mechanism, as indicated by arrow 46. Only the contract executor 16, the holder of the private key E 44, is able to decrypt the encrypted cryptographic keys 32-1-32-N of the contract creator 12. The contract creator 12 then generates encrypted wrappers 38-1-38-N ("$W_1$-$W_N$") that contain the encrypted keys 32-1-32-N, and which are encrypted using a corresponding public key 50-1-50-N ("$O_1$-$O_N$") of the corresponding oracle 20-1-20-N that will confirm the condition precedent 28-1-28-N identified in the corresponding policy 30-1-30-N. Each of the public keys 50-1-50-N corresponds to one of a plurality of private keys 54-1-54-N ("$O_1$-$O_N$") of the respective oracles 20-1-20-N, and, in some examples, may be provided by the oracles 20-1-20-N to the contract creator 12, as indicated by arrows 56 and 58. The term "wrapper" in this context merely refers to the further encryption of the encrypted keys 32-1-32-N, and does not imply any particular data structure or format.

As an example, the encrypted key 32-1 is encrypted by the public key 50-1 of the oracle 20-1 because the corresponding policy 30-1 ("$P_1$") will be confirmed by the oracle 20-1. Note that via this mechanism, the contract executor 16 cannot access the encrypted key 32-1 unless the encrypted key 32-1 is first decrypted by the oracle 20-1.

The contract creator 12 also generates a respective plurality of envelopes 48-1-48-N ("$V_1$-$V_N$"), each of which includes the corresponding wrapper 38-1-38-N and the corresponding policy 30-1-30-N. In some examples, the contract creator 12 may use the public key 50-1-50-N of the respective oracle 20-1-20-N to authenticate (but not necessarily encrypt) the corresponding policies 30-1-30-N such that only the corresponding oracle 20-1-20-N is able to authenticate the corresponding policy 30-1-30-N and decrypt the corresponding wrapper 38-1-38-N. Such authentication and encryption may, in some examples, utilize an authenticated encryption with associated data (AEAD) encryption method. In such examples, the envelopes 48-1-48-N may include a suitable header or other metadata as appropriate. Thus, for example, only the oracle 20-1 can authenticate the policy 30-1 and decrypt the wrapper 38-1 encrypted using the public key 50-1, and only the oracle 20-N can authenticate the policy 30-N and decrypt the wrapper 38-N encrypted using the public key 50-N.

The contract creator 12 may also optionally generate a contract executor action 59 that identifies an action to be taken by the contract executor 16 in response to one or more responses from the oracles 20-1-20-N. The contract creator 12 may then deploy the smart contract 26, containing the envelopes 48-1-48-N, the encrypted package 34, a required subset size 61 ("R"), and the contract executor action 59 to the contract executor 16, as indicated by arrow 60. In some examples, the contract creator 12 may encrypt the smart contract 26 using the public key 40 of the contract executor 16 prior to deploying the smart contract 26 to the contract executor 16. In other examples the contract creator 12 may not encrypt the smart contract 26 using the public key 40 of the contract executor 16. In still other examples, the contract creator 12 may deploy the smart contract 26 to the contract executor 16 using a secure transport protocol such as Secure Sockets Layer (SSL) and/or Transport Layer Security (TLS).

As noted above, in this example, the encrypted package 34 can only be decrypted with a subset of at least size R (where 1≤R≤N) of the symmetric keys 32-1-32-N used to encrypt the sensitive data 24. Accordingly, the smart contract 26 can only be executed after at least a number R of the plurality of policies 30-1-30-N have been satisfied. Thus, in some examples, the contract executor 16 to which the smart contract 26 was deployed may determine, for each policy 30 $P_X$ in a subset of at least size R of the plurality of policies 30-1-30-N has been met based on the one or more conditions precedent 28 of the policy 30 $P_X$. As an example, for the policy 30-1 ("$P_1$"), the contract executor 16 determines whether the condition(s) precedent 28-1 of the policy 30-1 have been satisfied. If so, the contract executor 16 needs to decrypt the wrapper 38-1 in order to obtain the encrypted symmetric key 32-1. However, the wrapper 38-1 was encrypted using the public key 50-1 of the oracle 20-1.

Accordingly, the contract executor 16 transmits the envelope 48-1 of the smart contract 26 to the oracle 20-1, as indicated by arrow 62. After receiving the envelope 48-1, the oracle 20-1 confirms that the condition(s) precedent 28-1 of the policy 30-1 of the smart contract 26 have been satisfied. For example, the oracle 20-1 accesses data that identifies the current price of a particular stock, and based on the policy 30-1, confirms that the current price is above or below some predetermined price identified in the policy 30-1. If so, the oracle 20-1 decrypts the wrapper 38-1 using the private key 54-1, and transmits the decrypted wrapper 38-1 back to the contract executor 16, as indicated by arrow 64. Note that, in some examples, the oracle 20-1 may opt to decrypt the wrapper 38-1 prior to evaluating the policy 30-1, rather than subsequent to evaluating the policy 30-1. The contract executor 16 then decrypts the encrypted symmetric key 32-1 using the private key E 44 of the contract executor 16.

As another example with respect to the policy 30-N ("$P_N$"), the contract executor 16 transmits the envelope 48-N of the smart contract 26 to the oracle 20-N, as indicated by arrow 66. Upon receiving the envelope 48-N, the oracle 20-N evaluates the condition(s) precedent 28-N of the policy 30-N of the smart contract 26. As an example, the oracle 20-N verifies that the appropriate domestic or foreign stock market is currently open and thus that a stock trade can be made at the current time. The oracle 20-N then decrypts the wrapper 38-N using the private key 54-N of the oracle 20-N, and transmits the wrapper 38-N back to the contract executor 16, as indicated by arrow 68. The contract executor 16 then decrypts the symmetric key 32-N of the wrapper 38-N using the private key E 44.

Once a subset of at least size R of the symmetric keys 32-1-32-N have been decrypted by the contract executor 16, the contract executor 16 uses the decrypted symmetric keys 32-1-32-N to decrypt the sensitive data 24 of the encrypted package 34 of the smart contract 26. The contract executor 16 then executes the smart contract 26 using the sensitive data 24. To further the example above, the contract executor action 59 may be to sell the stock. The sensitive data 24 of the encrypted package 34 may be the user's (e.g., a party to the smart contract 26) authentication information needed to initiate the sale of the stock.

The utility of the computing system 10 may be illustrated by an example use case. Assume that the purpose of the smart contract 26 is to sell shares of a mutual fund comprising 1000 stocks if, at a specified time, more than half (i.e., R=501 in this example) of the constituent stocks that make up the mutual fund have each decreased in value by 10%, as determined by stock price agents represented by the oracles 20-1-20-N (i.e., N=1000 in this example).

The contract creator 12 thus generates the smart contract 26 indicating the one or more conditions precedent 28-1-28-N, specifying the respective threshold stock prices as determined by the oracles 20-1-20-N. To perform the sell operation, the contract creator 12 must provide the sensitive data 24, which, in this example use case, comprises authentication information for the mutual fund broker. Accordingly, the contract creator 12 encrypts the sensitive data 24 and the symmetric keys 32-1-32-N as described above, and then deploys the smart contract 26 to the contract executor 16. At a later point in time, the contract executor 16 determines that at least 501 of the constituent stocks have decreased in value by 10% or more, and thus interacts with the respective oracles 20-1-20-N as described above to obtain 501 of the symmetric keys 32-1-32-N. The contract executor 16 then decrypts the encrypted package 34 to obtain the sensitive data 24, and uses the sensitive data 24 to execute the sell operation.

Figure 2:
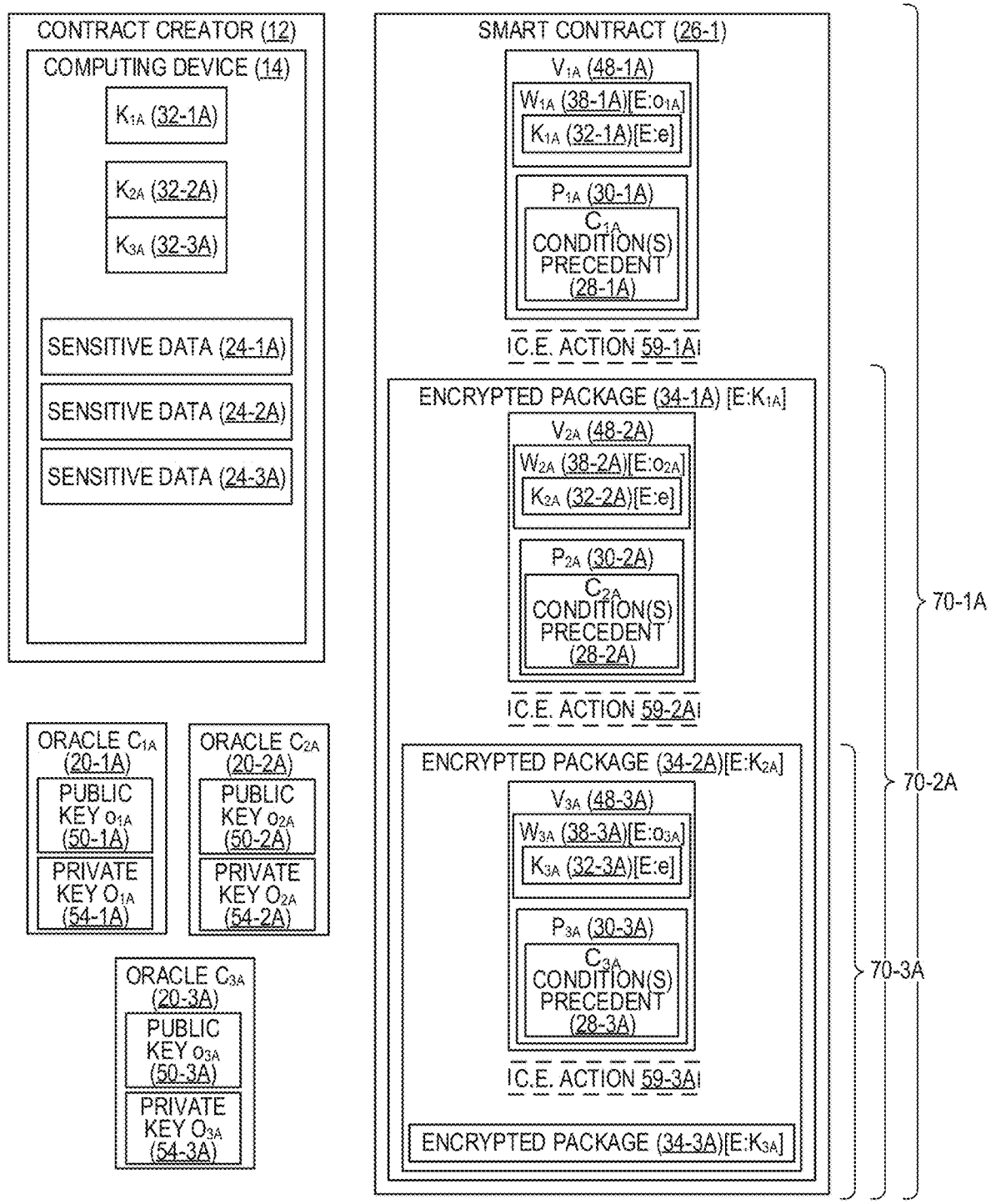
FIG. 2 is a block diagram of a computing system according to another example, wherein a contract creator generates a multi-stage smart contract that is substantially similar to the smart contract illustrated in FIG. 1, except that the multi-stage smart contract is performed by a contract executor in multiple stages.

FIG. 2 is a block diagram of a computing system 10-1 according to another example, wherein the contract creator 12 generates a multi-stage smart contract 26-1 that is substantially similar to the smart contract 26 discussed above, except that the multi-stage smart contract 26-1 is performed by the contract executor 16 in multiple stages. Each stage is protected such that the contract executor 16 cannot interpret the data that defines a successive stage until the current stage has been performed. Note that solely for purposes of space, certain components illustrated in the computing system 10 of FIG. 1, such as the contract executor 16, have been omitted in FIG. 2, however, the contract executor 16 implements substantially the same functionality for the smart contract 26-1 as was described above for the smart contract 26.

In this example, the multi-stage smart contract 26-1 comprises three stages 70-1A-70-3A (generally, stages 70). The stage 70-1A comprises at least one envelope 48-1A, which in turn includes an encrypted key 32-1A ("$K_{1A}$") of the contract creator 12 that has been encrypted using the public key 40 of the contract executor 16. The encrypted key 32-1A is placed inside an encrypted wrapper 38-1A that has been encrypted using the public key 50-1A ("$o_{1A}$") of an oracle 20-1A ("$C_{1A}$"). The envelope 48-1A also includes a policy 30-1A that includes a condition precedent 28-1A that the oracle 20-1A can determine has been met. The stage 70-1A may also include a contract executor action 59-1A that the contract executor 16 is to perform subsequent to confirmation by the oracle 20-1A that the condition precedent 28-1A has been met. The stage 70-1A includes an encrypted package 34-1A that can be decrypted with the key 32-1A. After the oracle 20-1A confirms that the condition precedent 28-1A has been met, the oracle 20-1A decrypts the wrapper 38-1A using a private key 54-1A ("$O_{1A}$"), allowing the contract executor 16 to decrypt the encrypted key 32-1A using the private key 44 of the contract executor 16. The contract executor 16 may then use the decrypted key 32-1A to decrypt the encrypted package 34-1A and access the sensitive data 24-1A. Until and unless the oracle 20-1A confirms that the condition precedent 28-1A has been met, the contract executor 16 cannot decrypt the encrypted package 34-1A and thus cannot view the contents of the encrypted package 34-1A.

The encrypted package 34-1A contains the information necessary to implement the remainder of the stages 70-2A and 70-3A. Although not illustrated, the encrypted package 34-1A may also include information necessary for the contract executor 16 to carry out the contract executor action 59-1A. The encrypted package 34-1A comprises at least one envelope 48-2A, which in turn includes an encrypted key 32-2A of the contract creator 12 that has been encrypted using the public key 40 of the contract executor 16. The encrypted key 32-2A is placed inside an encrypted wrapper 38-2A that has been encrypted using the public key 50-2A ("$o_{2A}$") of an oracle 20-2A ("$C_{2A}$"). The envelope 48-2A also includes a policy 30-2A that includes a condition precedent 28-2A that the oracle 20-2A can determine has been met. The stage 70-2A may also include a contract executor action 59-2A that the contract executor 16 is to perform subsequent to confirmation by the oracle 20-2A that the condition precedent 28-2A has been met. The stage 70-2A includes an encrypted package 34-2A that can be decrypted with the key 32-2A. Thus, after the oracle 20-2A confirms that the condition precedent 28-2A has been met, and in response decrypts the wrapper 38-2A using a private key 54-2A ("$O_{2A}$"), the contract executor 16 can decrypt the encrypted key 32-2A using the private key 44 of the contract executor 16, and then use the decrypted key 32-2A to decrypt the encrypted package 34-2A and access the sensitive data 24-2A. Until and unless the oracle 20-2A confirms that the condition precedent 28-2A has been met, the contract executor 16 cannot decrypt the encrypted package 34-2A and thus cannot view the contents of the encrypted package 34-2A.

The encrypted package 34-2A contains the information necessary to implement the final stage 70-3A. Although not illustrated, the encrypted package 34-2A may also include information necessary for the contract executor 16 to carry out the contract executor action 59-2A. The encrypted package 34-2A comprises at least one envelope 48-3A, which in turn includes an encrypted key 32-3A of the contract creator 12 that has been encrypted using the public key 40 of the contract executor 16. The encrypted key 32-3A is placed inside an encrypted wrapper 38-3A that has been encrypted using public key 50-3A ("$o_{3A}$") of an oracle 20-3A ("$C_{3A}$"). The envelope 48-3A also includes a policy 30-3A that includes a condition precedent 28-3A that the oracle 20-3A can determine has been met. The stage 70-3A may also include a contract executor action 59-3A that the contract executor 16 is to perform subsequent to confirmation by the oracle 20-3A that the condition precedent 28-3A has been met. The stage 70-3A includes an encrypted package 34-3A that can be decrypted with the key 32-3A. Thus, after the oracle 20-3A confirms that the condition precedent 28-3A has been met, and in response decrypts the wrapper 38-3A using a private key 54-3A ("$O_{3A}$"), the contract executor 16 can decrypt the encrypted key 32-3A using the private key 44 of the contract executor 16, and then use the decrypted key 32-3A to decrypt the encrypted package 34-3A and access the sensitive data 24-3A. Until and unless the oracle 20-3A confirms that the condition precedent 28-3A has been met, the contract executor 16 cannot decrypt the encrypted package 34-3A and thus cannot view the contents of the encrypted package 34-3A. The encrypted package 34-3A, for example, may include the information necessary for the contract executor 16 to carry out the contract executor action 59-3A.

The contract creator 12 generates the multi-stage smart contract 26-1 in reverse chronological order. For example, the contract creator 12 first generates the data needed for the stage 70-3A, then generates the data needed for the stage 70-2A, and then generates the data needed for the stage 70-1A. Data in the multi-stage smart contract 26-1 may be encrypted multiple times. As an example, the key 32-3A is first encrypted with the public key 40 of the contract executor 16, then with the public key 50-3A of the oracle 20-3A, then with the key 32-2A of the contract creator 12 when the encrypted package 34-2A is created. The key 32-3A is further encrypted with the key 32-1A of the contract creator 12 when the encrypted package 34-1A is created. Thus, in this example, the key 32-3A would be encrypted four times and be embedded within four layers of encryption. Note that while for purposes of illustration and clarity only three stages 70-1A-70-3A have been illustrated, the multi-stage smart contract 26-1 may comprise any number of stages, including tens or hundreds of different stages.

Figure 3:
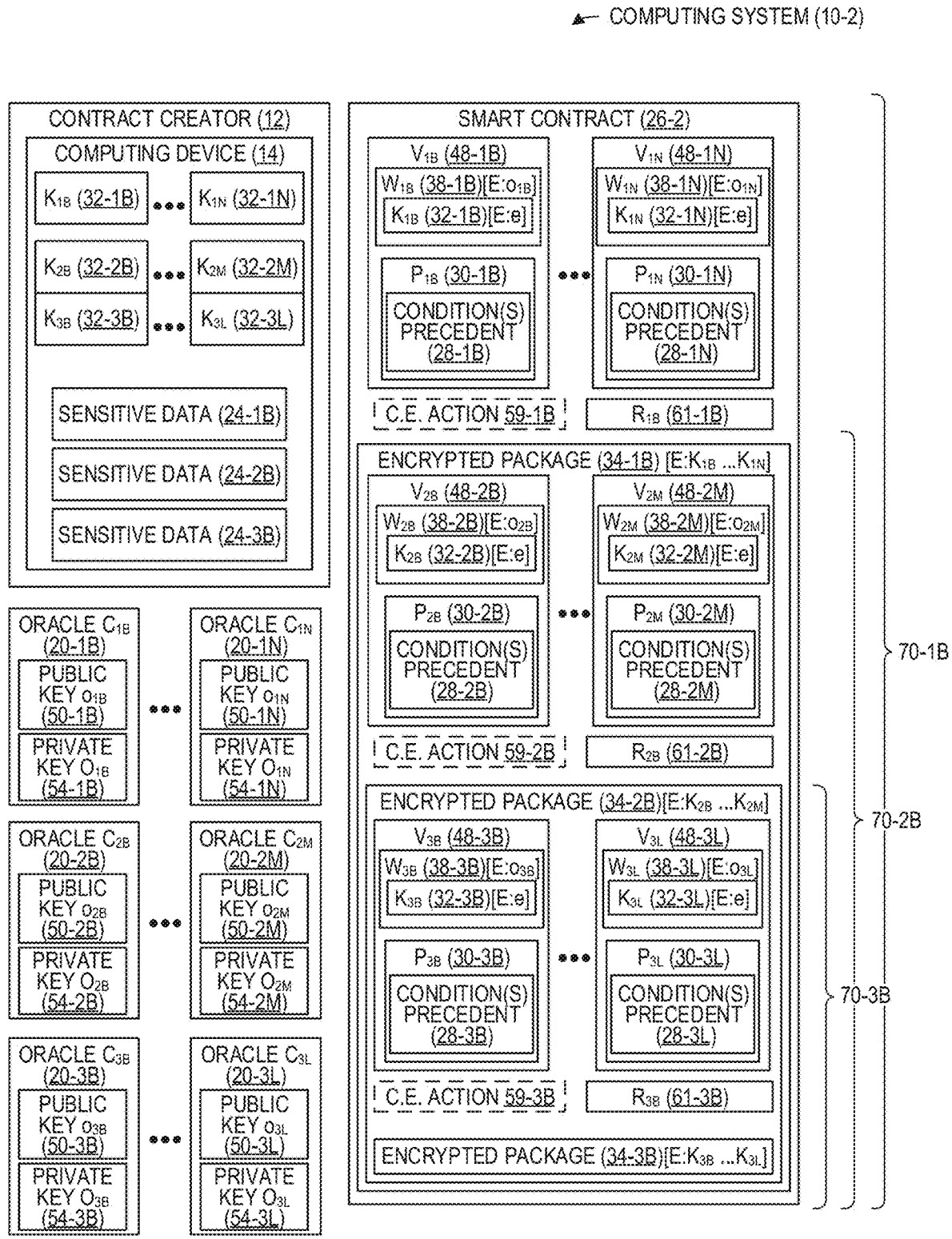
FIG. 3 is a block diagram of a computing system according to another example, wherein the contract creator generates a multi-stage smart contract that is substantially similar to the multi-stage smart contract discussed in FIG. 2, except that for at least some stages, the contract creator generates an encrypted package that corresponds to a stage using symmetric keys according to a threshold cryptosystem that requires a specified subset of at least size R (where $1 \leq R \leq N$) of the symmetric keys to decrypt the encrypted package.

FIG. 3 is a block diagram illustrating a computing system 10-2 according to another example, wherein the contract creator 12 generates a multi-stage smart contract 26-2 that is substantially similar to the multi-stage smart contract 26-1 discussed above, except that for at least some stages 70, the contract creator 12 generates an encrypted package 34 that corresponds to a stage 70 using symmetric keys 32 according to a threshold cryptosystem that requires a specified subset of at least size R (where 1≤R≤N) of the symmetric keys 32 to decrypt the encrypted package 34. As discussed above, such threshold cryptosystem may, in some examples, utilize the Shamir's Secret Sharing cryptosystem, as a non-limiting example.

The multi-stage smart contract 26-2 is performed by the contract executor 16 in multiple stages. Each stage 70 is again protected such that the contract executor 16 cannot interpret the data that defines a successive stage 70 until the current stage 70 has been performed. Note that solely for purposes of space, certain components illustrated in the computing system 10 of FIG. 1, such as the contract executor 16, have been omitted in FIG. 3; however, the contract executor 16 implements substantially the same functionality for the smart contract 26-2 as was described above for the smart contract 26 and the smart contract 26-1.

In this example, the multi-stage smart contract 26-2 comprises three stages 70-1B-70-3B (generally, stages 70). The stage 70-1B comprises a plurality of envelopes 48-1B-48-1N. The range "1B-1N" does not imply any particular number, and can be any desired number of at least two. The contract creator 12 generates a plurality of symmetric keys 32-1B-32-1N ("$K_{1B}$-$K_{1N}$") such that at least a specified subset size 61-1B ("$R_{1B}$") of the symmetric keys 32-1B-32-1N are needed to decrypt whatever is encrypted using the symmetric keys 32-1B-32-1N. The contract creator 12 uses the symmetric keys 32-1B-32-1N to encrypt the sensitive data 24-1B to generate the encrypted package 34-1B. Each of the symmetric keys 32-1B-32-1N are then encrypted using a public key e 40 of the contract executor 16. Each encrypted key 32-1B-32-1N is placed inside an encrypted wrapper 38-1B-38-1N that has been encrypted using the public key 50-1B ("$o_{1B}$") of an oracle 20-1B ("$C_{1B}$") that confirms the conditions precedent 28-1B-28-1N identified in the corresponding policy 30-1B-30-1N ("$P_{1B}$-$P_{1N}$").

As an example, the envelope 48-1B includes the wrapper 38-1B, the key 32-1B, the policy 30-1B and the condition(s) precedent 28-1B. It may be stated herein that the envelope 48-1B, the wrapper 38-1B, the key 32-1B, the policy 30-1B and the condition(s) precedent 28-1B each correspond to one another. In this example, the contract creator encrypts the key 32-1B with the public key 40 of the contract executor 16, and generates the encrypted wrapper 38-1B by encrypting the encrypted key 32-1B with the public key 50-1B of the oracle 20-1B that is capable of confirming the conditions precedent 28-1B.

The encrypted package 34-1B can only be decrypted by the contract executor 16 once the contract executor 16 has decrypted a subset size 61-1B of the keys 32-1B-32-1N. In particular, once a subset size 61-1B of the oracles 20-1B-20-1N have confirmed that the corresponding subset of conditions precedent 28-1B-28-1N have been met, and have decrypted the corresponding subset of wrappers 38-1B-38-1N using the private keys 54-1B-54-1N of the oracles 20-1B-20-1N, the contract executor 16 can then decrypt the corresponding subset of encrypted keys 32-1B-32-1N using the private key 44 of the contract executor 16.

The encrypted package 34-1B contains the information necessary to implement the remainder of the stages 70-2B and 70-3B. Although not illustrated, the encrypted package 34-1B may also include information necessary for the contract executor 16 to carry out the contract executor action 59-1B.

The stage 70-2B comprises a plurality of envelopes 48-2B-48-2M. The range "2B-2M" does not imply any particular number, and can be any desired number of at least two. The contract creator 12 generates a plurality of symmetric keys 32-2B-32-2M ("$K_{2B}$-$K_{2M}$") such that at least a specified subset size 61-2B ("$R_{2B}$") of the symmetric keys 32-2B-32-2M are needed to decrypt whatever is encrypted using the symmetric keys 32-2B-32-2M. The contract creator 12 uses the symmetric keys 32-2B-32-2M to encrypt the sensitive data 24-2B to generate the encrypted package 34-2B. Each of the symmetric keys 32-2B-32-2M are then encrypted using the public key 40 of the contract executor 16. Each encrypted key 32-2B-32-2M is placed inside an encrypted wrapper 38-2B-38-2M that has been encrypted using the public key 50-2B ("$O_{2B}$") of an oracle 20-2B ("$C_{2B}$") that confirms the conditions precedent 28-2B-28-2M identified in the corresponding policy 30-2B-30-2M ("$P_{2B}$-$P_{2M}$").

As an example, the envelope 48-2B includes the wrapper 38-2B, the key 32-2B, the policy 30-2B and the condition(s) precedent 28-2B. The contract creator 12 encrypts the key 32-2B with the public key 40 of the contract executor 16, and generates the encrypted wrapper 38-2B by encrypting the encrypted key 32-2B with the public key 50-2B of the oracle 20-2B that is capable of confirming the conditions precedent 28-2B.

The encrypted package 34-2B can only be decrypted by the contract executor 16 once the contract executor 16 has decrypted a subset size 61-2B of the keys 32-2B-32-2M. In particular, once a subset size 61-2B of the oracles 20-2B-20-2M have confirmed that the corresponding subset of conditions precedent 28-2B-28-2M have been met, and have decrypted the corresponding subset of wrappers 38-2B-38-2M using the private keys 54-2B-54-2M of the oracles 20-2B-20-2M, the contract executor 16 can then decrypt the corresponding subset of encrypted keys 32-2B-32-2M using the private key 44 of the contract executor 16.

The encrypted package 34-2B contains the information necessary to implement the final stage 70-3B. Although not illustrated, the encrypted package 34-2B may also include information necessary for the contract executor 16 to carry out the contract executor action 59-2B. The stage 70-3B comprises a plurality of envelopes 48-3B-48-3L. The range "3B-3L" does not imply any particular number, and can be any desired number of at least two. The contract creator 12 generates a plurality of symmetric keys 32-3B-32-3L ("$K_{3B}$-$K_{3L}$") such that at least a specified subset size 61-3B ("$R_{3B}$") of the symmetric keys 32-3B-32-3L are needed to decrypt whatever is encrypted using the symmetric keys 32-3B-32-3L. The contract creator 12 uses the symmetric keys 32-3B-32-3L to encrypt the sensitive data 24-3B to generate the encrypted package 34-3B. Each of the symmetric keys 32-3B-32-3L are then encrypted using the public key 40 of the contract executor 16. Each encrypted key 32-3B-32-3L is placed inside an encrypted wrapper 38-3B-38-3L that has been encrypted using the public key 50-3B ("$o_{3B}$") of an oracle 20-3B ("$C_{3B}$") that confirms the conditions precedent 28-3B-28-3L identified in the corresponding policy 30-3B-30-3L ("$P_{3B}$-$P_{3L}$").

As an example, the envelope 48-3B includes the wrapper 38-3B, the key 32-3B, the policy 30-3B and the condition(s) precedent 28-3B. The contract creator 12 encrypts the key 32-3B with the public key 40 of the contract executor 16, and generates the encrypted wrapper 38-3B by encrypting the encrypted key 32-3B with the public key 50-3B of the oracle 20-3B that is capable of confirming the conditions precedent 28-3B.

The encrypted package 34-3B can only be decrypted by the contract executor 16 once the contract executor 16 has decrypted a subset size 61-3B of the keys 32-3B-32-3L. In particular, once the subset size 61-3B of the oracles 20-3B-20-3L have confirmed that the corresponding subset of conditions precedent 28-3B-28-3L have been met, and have decrypted the corresponding subset of wrappers 38-3B-38-3L using the private keys 54-3B-54-3L of the oracles 20-3B-20-3L, the contract executor 16 can then decrypt the corresponding subset of encrypted keys 32-3B-32-3L using the private key 44 of the contract executor 16.

The contract creator 12 generates the multi-stage smart contract 26-2 in reverse chronological order. For example, the contract creator 12 first generates the data needed for the stage 70-3B, then generates the data needed for the stage 70-2B, and then generates the data needed for the stage 70-1B. Note that while for purposes of illustration and clarity only three stages 70-1B-70-3B have been illustrated, the multi-stage smart contract 26-2 may comprise any number of stages, including tens or hundreds of different stages.

Figure 4:
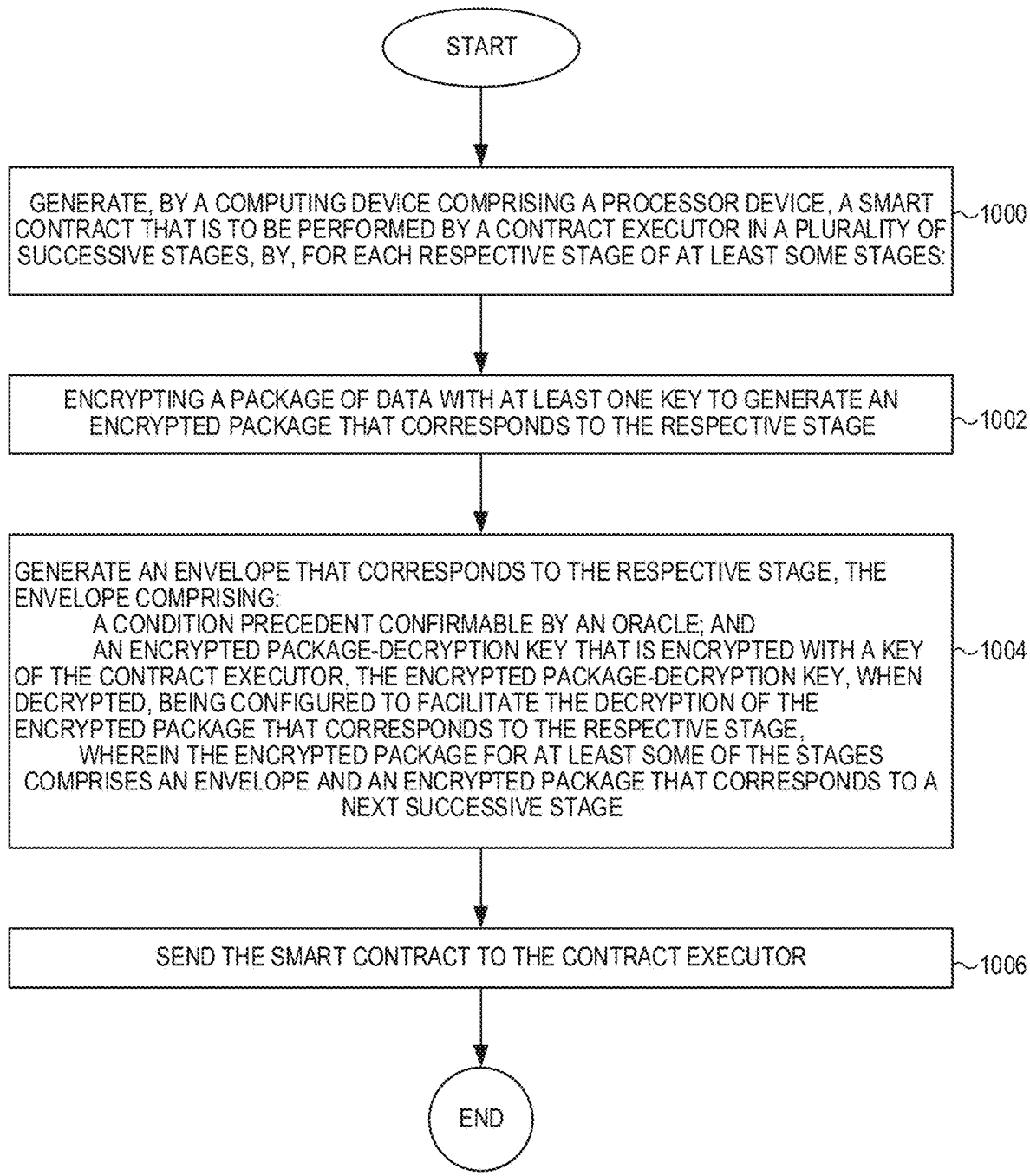
FIG. 4 is a flowchart illustrating a method for generating a multi-stage smart contract according to one example.

FIG. 4 is a flowchart illustrating a method for generating a multi-stage smart contract according to one example. FIG. 4 will be discussed in conjunction with FIG. 2. The contract creator 12 generates the smart contract 26-1 that is to be performed by the electronic contract executor 16 (hereinafter "contract executor 16" for the sake of brevity) in the plurality of successive stages 70-1A-70-3A, by, for each respective stage of at least some of the stages 70-1A-70-3A, encrypting a package of data with at least one key K to generate an encrypted package 34 that corresponds to the respective stage 70 (FIG. 4, blocks 1000-1002). Throughout the specification and claims, a key K used to generate an encrypted package 34 may also be referred to herein as a package-decryption key K since the key K may be symmetric and may be used both to encrypt the encrypted package 34 and to decrypt the encrypted package 34.

Also for each respective stage 70 of the at least some of the stages 70-1A-70-3A, the contract creator 12 generates an envelope 48 that corresponds to the respective stage 70. The envelope 48 comprises a condition precedent 28 confirmable by an oracle 20, and an encrypted package-decryption key K that is encrypted with the public key 40 of the contract executor 16, the encrypted package-decryption key K, when decrypted, being configured to facilitate the decryption of the encrypted package 34 that corresponds to the respective stage 70, wherein the encrypted package 34 for at least some of the stages 70 comprises an envelope 48 and an encrypted package 34 that corresponds to a next successive stage 70 (FIG. 4, block 1004). The contract creator 12 then sends the smart contract 26-1 to the contract executor 16 (FIG. 4, block 1006).

FIGS. 5A-5F are communication diagrams illustrating communication flows among the elements of the computing system 10 of FIG. 1 for providing smart contracts including sensitive data, according to one example. Elements of FIG. 1 are referenced in describing FIGS. 5A-5F for the sake of clarity. As seen in FIGS. 5A-5F, each of the contract creator 12, the contract executor 16, and the oracles 20-1 and 20-N are represented by vertical lines, with communications between these elements illustrated by captioned arrows, and operations performed by each element illustrated by captioned boxes.

Figure 5A:
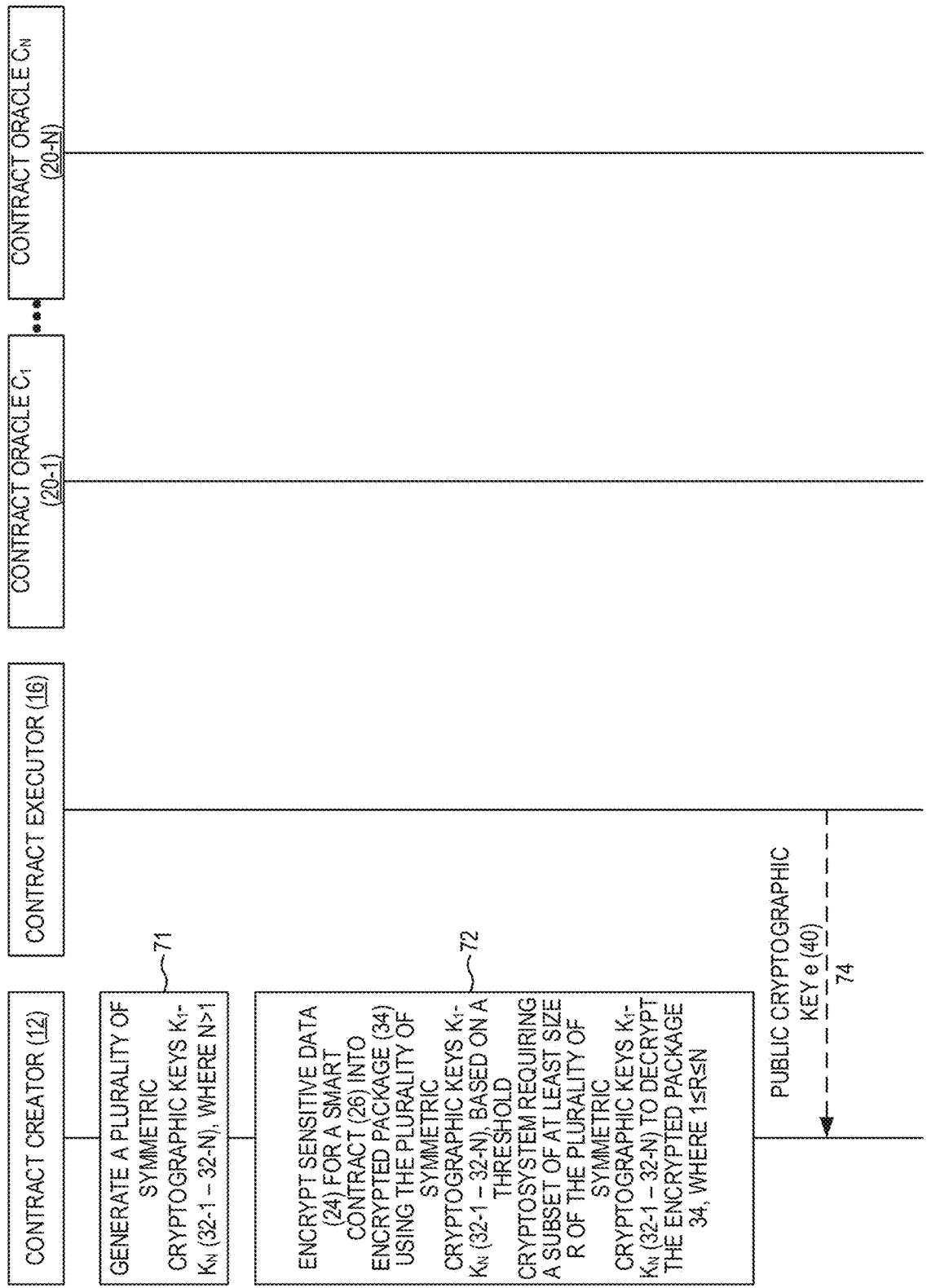
FIGS. 5A-5F are communication diagrams illustrating communication flows among the elements of the computing system of FIG. 1 for providing smart contracts including sensitive data, according to one example.

In the example of FIG. 5A, operations begin with the contract creator 12 generating the plurality of symmetric keys 32-1-32-N ("$K_1$-$K_N$") where N>1, as indicated by box 71. The contract creator 12 encrypts the sensitive data 24 for the smart contract 26 into the encrypted package 34 using the plurality of symmetric keys 32-1-32-N, based on a threshold cryptosystem requiring a subset of at least size R (where $1 \leq R \leq N$) of the plurality of symmetric keys 32-1-32-N to decrypt the encrypted package 34, as indicated by box 72. In some examples, the contract creator 12 may receive the public key e 40 from the contract executor 16 (or from a public key registry) as indicated by arrow 74. Operations then continue in FIG. 5B.

Figure 5B:
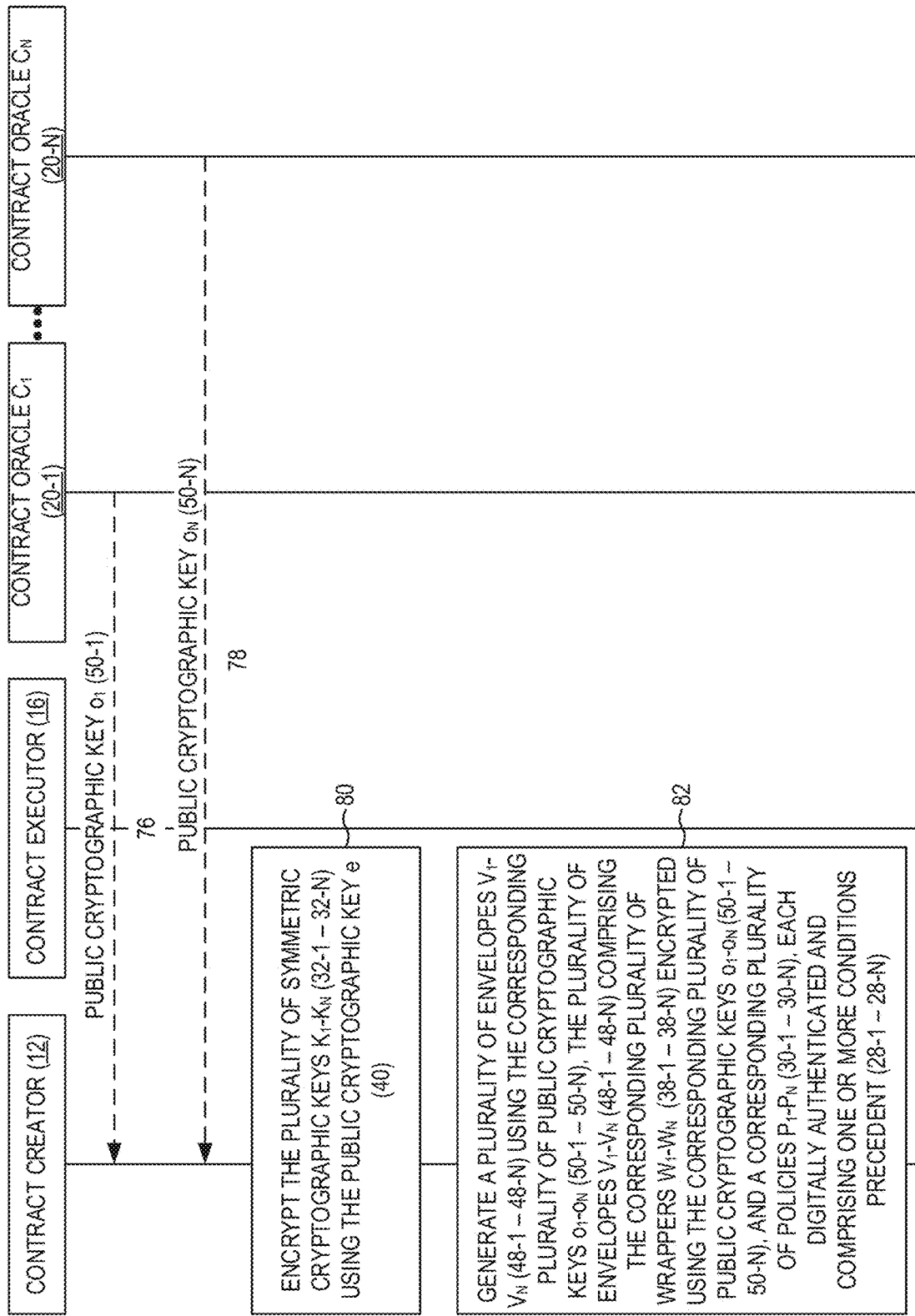

Referring now to FIG. 5B, the contract creator 12 in some examples may also receive the public key 50-1 from the oracle 20-1, as indicated by arrow 76. Likewise, the contract creator 12 may receive the public key 50-N from the oracle 20-N, as indicated by arrow 78. The contract creator 12 then encrypts the plurality of symmetric keys 32-1-32-N using the public key e 40 of the contract executor 16, as indicated by block 80.

The contract creator 12 generates the plurality of envelopes 48-1-48-N ("$V_1$-$V_N$") using the corresponding plurality of public keys 50-1-50-N ("$o_1$-$o_N$"), as indicated by block 82. The plurality of envelopes 48-1-48-N comprises the corresponding plurality of encrypted wrappers 38-1-38-N, encrypted using the corresponding plurality of public keys 50-1-50-N, as well as the corresponding plurality of policies 30-1-30-N ("$P_1$-$P_N$"), each digitally authenticated (but not necessarily encrypted) and comprising the one or more conditions precedent 28-1-28-N. Operations then continue in FIG. 5C.

Figure 5C:
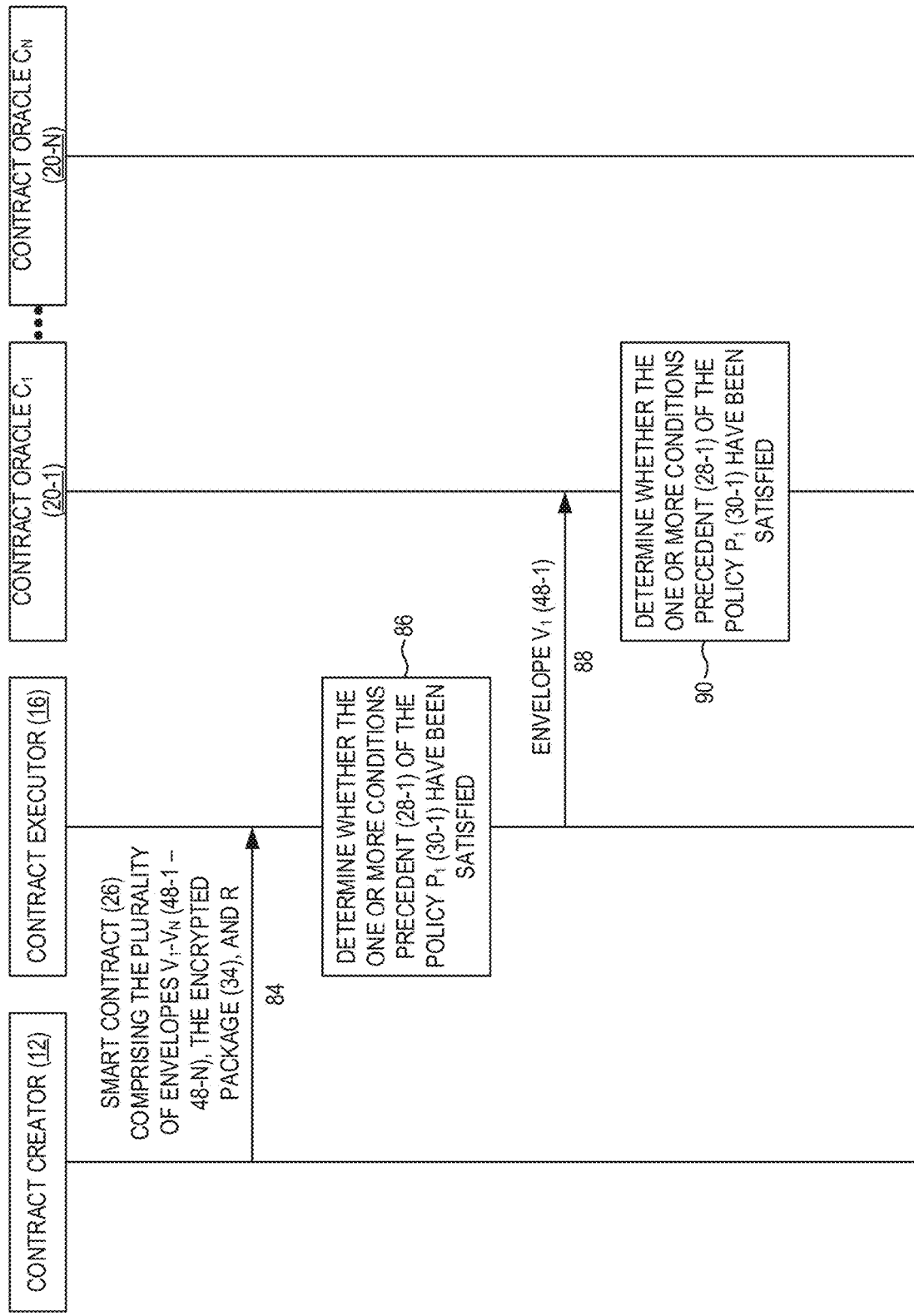

Turning to FIG. 5C, the contract creator 12 then deploys the smart contract 26 comprising the plurality of envelopes 48-1-48-N, the encrypted package 34, and the value R to the contract executor 16, as indicated by arrow 84. At a later time, the contract executor 16 may evaluate the policies 30-1-30-N to determine whether a subset of at least size R of the policies 30-1-30-N have been satisfied (and thus the smart contract 26 can be executed). Accordingly, the contract executor 16 may perform operations in concert with one or more of the oracles 20-1-20-N to retrieve one or more of the symmetric keys 32-1-32-N required to decrypt the encrypted package 34 and execute the smart contract 26. In this regard, in the example discussed in FIGS. 5C-5F, it is assumed that only the symmetric keys 32-1 and 32-N are required to decrypt the encrypted package 34. However, it is to be understood that the operations described herein may be performed by the contract executor 16 in relation to a number R of the symmetric keys 32-1-32-N.

Hence, the contract executor 16 determines whether the one or more conditions precedent 28-1 of the policy 30-1 ("$P_1$") have been satisfied, as indicated by block 86. If so, the contract executor 16 transmits the envelope 48-1 ("$V_1$") to the corresponding oracle 20-1 ("$C_1$"), as indicated by arrow 88. Upon receiving the envelope 48-1, the oracle 20-1 also determines whether the one or more conditions precedent 28-1 of the policy 30-1 ("$P_1$") have been satisfied, as indicated by block 90. Operations then continue in FIG. 5D.

Figure 5D:
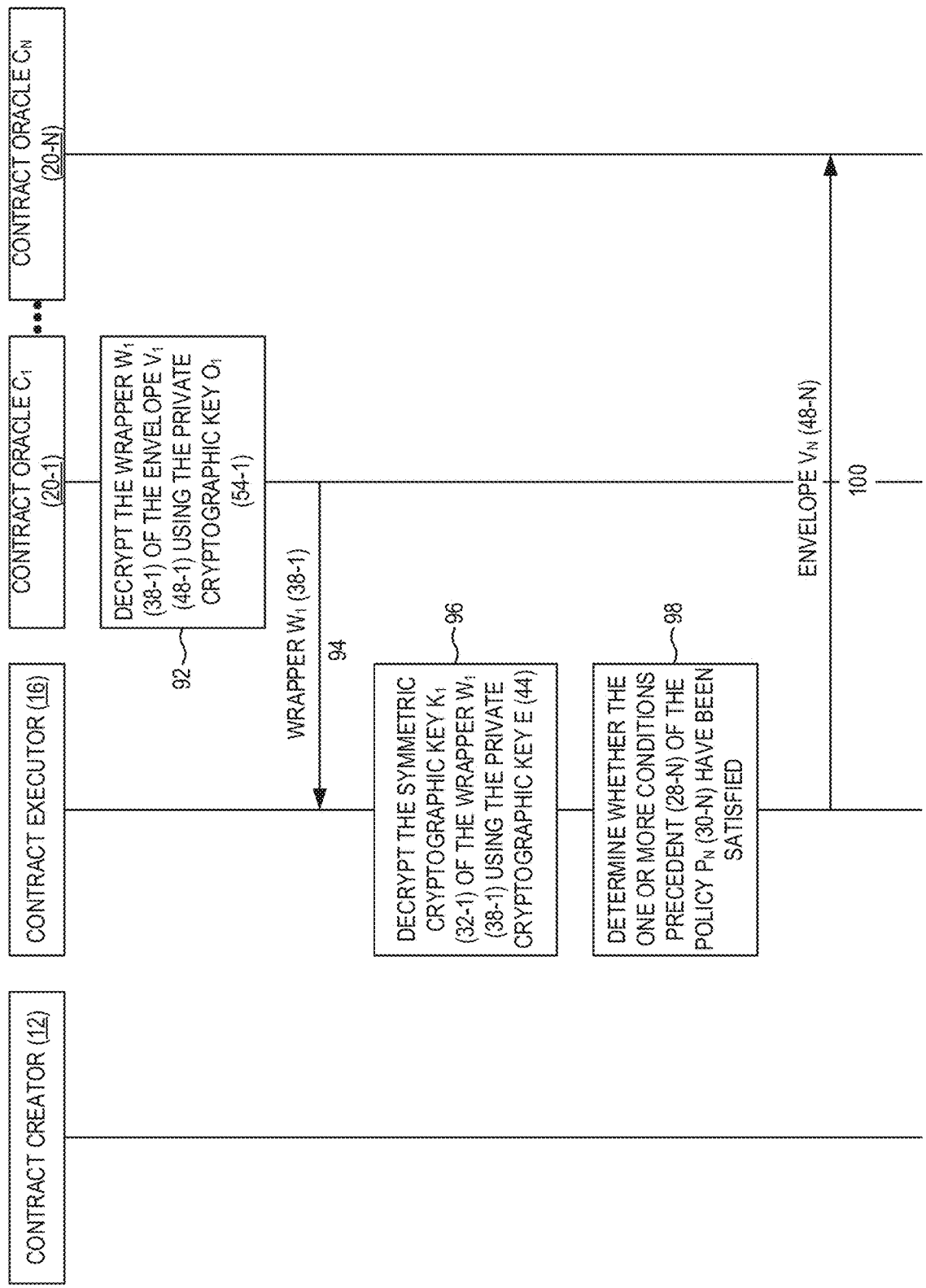

In FIG. 5D, the oracle 20-1 decrypts the wrapper 38-1 ("$W_1$") of the envelope 48-1 using the private key 54-1 ("$O_1$"), as indicated by block 92. Note that, in some examples such as those in which the evaluation of the one or more conditions precedent 28-1 of the policy 30-1 may cause a state change within the oracle 20-1, the oracle 20-1 may decrypt the wrapper 38-1 prior to determining whether the one or more conditions precedent 28-1 of the policy 30-1 ("$P_1$") have been satisfied. The oracle 20-1 then transmits the decrypted wrapper 38-1 back to the contract executor 16, as indicated by arrow 94. After receiving the wrapper 38-1, the contract executor 16 decrypts the symmetric key 32-1 ("$K_1$") of the wrapper 38-1 using the private key 44 ("E"), as indicated by box 96.

The contract executor also performs a similar series of operations with respect to the oracle 20-N ("$C_N$"). The contract executor 16 first determines whether the one or more conditions precedent 28-N of the policy 30-N ("$P_N$") have been satisfied, as indicated by block 98. If so, the contract executor 16 transmits the envelope 48-N ("$V_N$") to the corresponding oracle 20-N ("$C_N$"), as indicated by arrow 100. Operations then continue in FIG. 5E.

Figure 5E:
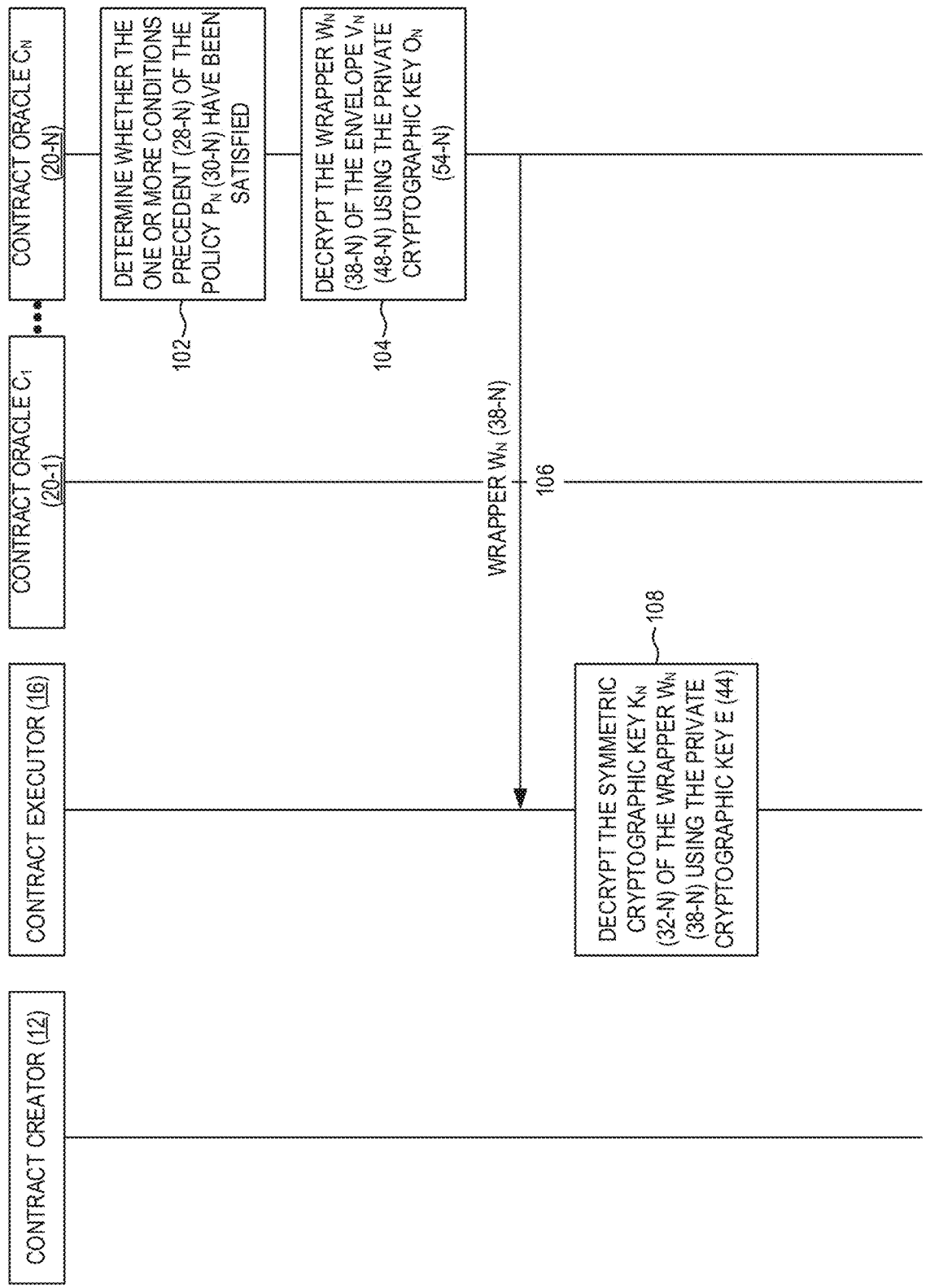

Referring now to FIG. 5E, the oracle 20-N, after receiving the envelope 48-N, also determines whether the one or more conditions precedent 28-N of the policy 30-N ("$P_N$") have been satisfied, as indicated by block 102. If so, the oracle 20-N decrypts the wrapper 38-N ("$W_N$") of the envelope 48-N using the private key 54-N ("$O_N$"), as indicated by block 104. The oracle 20-N next transmits the decrypted wrapper 38-N back to the contract executor 16, as indicated by arrow 106. Upon receiving the wrapper 38-N, the contract executor 16 decrypts the symmetric key 32-N ("$K_N$") of the wrapper 38-N using the private key 44 ("E"), as indicated by box 108. Operations then continue in FIG. 5F.

Figure 5F:
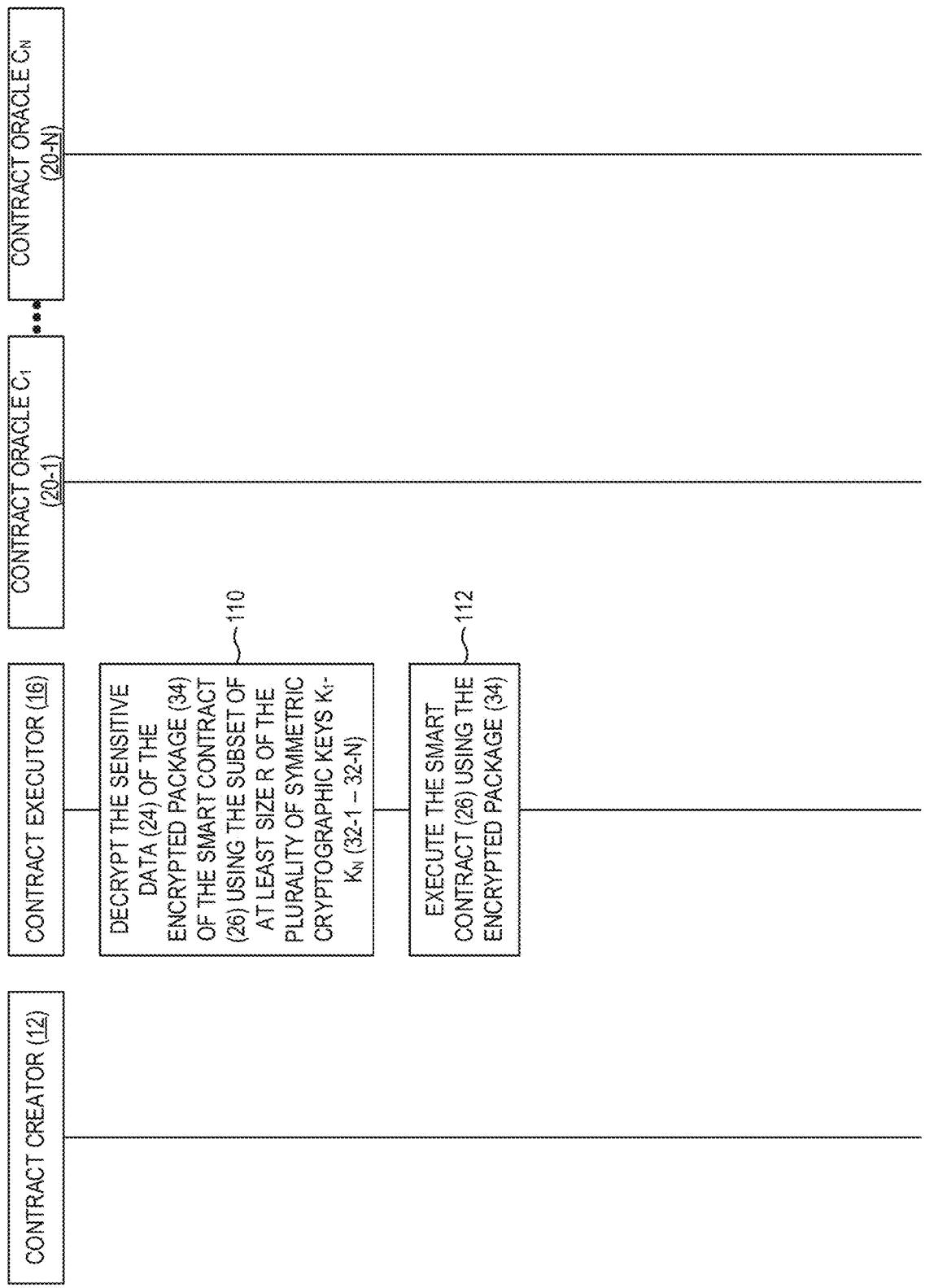

Turning now to FIG. 5F, once the contract executor 16 has received and decrypted a subset of at least size R of the plurality of symmetric keys 32-1-32-N (i.e., the symmetric keys 32-1 and 32-N in the present example), the contract executor 16 decrypts the sensitive data 24 of the encrypted package 34 of the smart contract 26 using the subset of at least size R of the plurality of symmetric keys 32-1-32-N, as indicated by box 110. The contract executor 16 then executes the smart contract 26 using the sensitive data 24, as indicated by box 112.

Figure 6A:
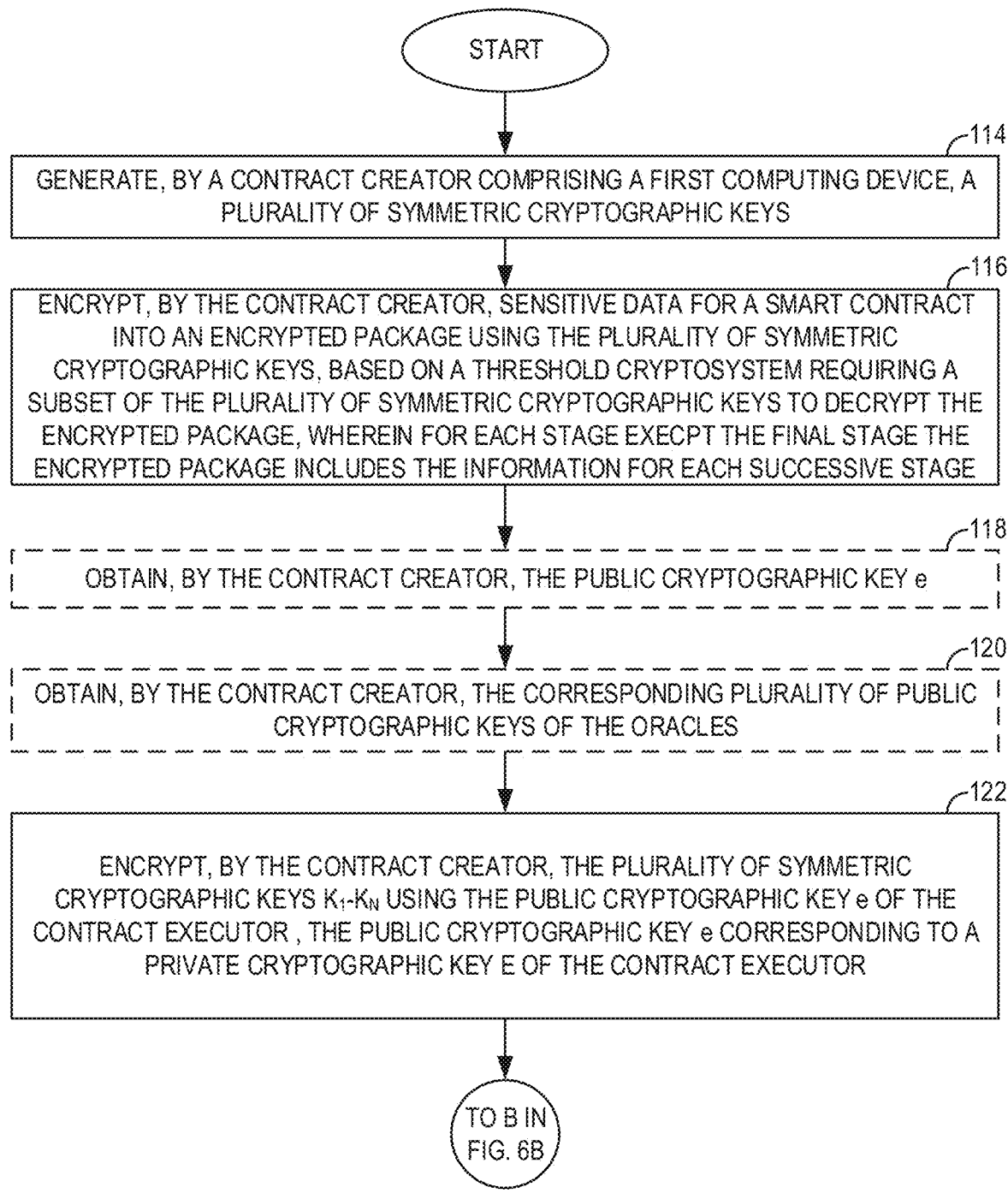
FIGS. 6A and 6B are flowcharts illustrating operations for providing multi-stage smart contracts including encryption of sensitive data with multiple oracle-provided encryption keys using threshold cryptosystems, according to one example.
Figure 6B:
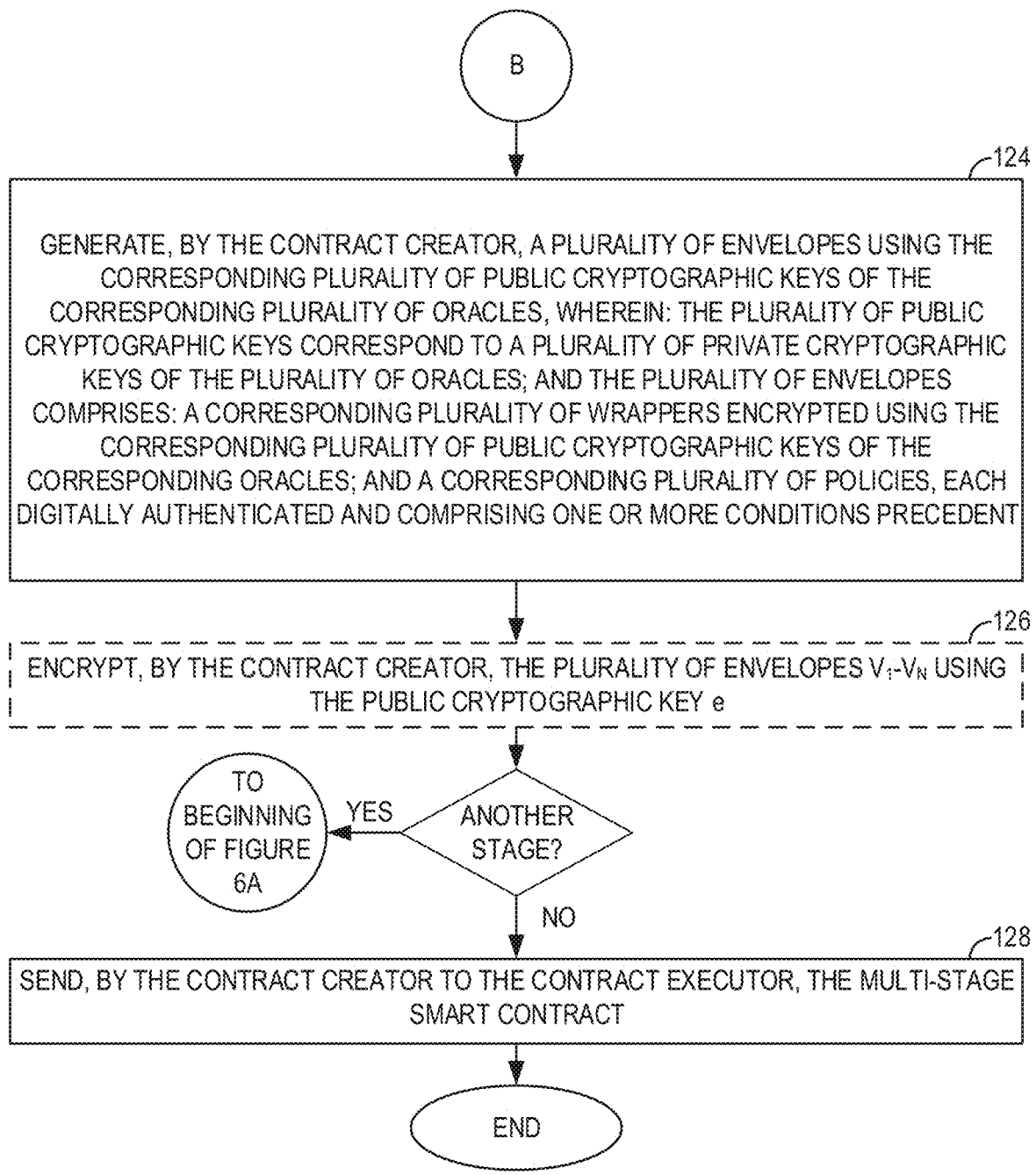

FIGS. 6A and 6B are flowcharts illustrating operations for providing multi-stage smart contracts including encryption of sensitive data with multiple oracle-provided encryption keys using threshold cryptosystems, according to one example. For the sake of clarity, elements of FIG. 3 are referenced in describing FIGS. 6A and 6B. Operations in FIG. 6A begin with the contract creator 12 of FIG. 3 generating the plurality of symmetric keys 32-3B-32-3L ("$K_{3B}$-$K_{3L}$") where L>1 (block 114). The contract creator 12 then encrypts the sensitive data 24-3B for stage 70-3B of the multi-stage smart contract 26-2 into the encrypted package 34-3B using the plurality of symmetric keys 32-3B-32-3L, based on a threshold cryptosystem requiring a subset of at least size $R_{3B}$ of the plurality of symmetric keys 32-3B-32-3L to decrypt the encrypted package 34-3B, where $1 \leq R_{3B} \leq L$. For each stage 70 except the final stage 70-3B, the encrypted package 34 includes the information for each successive stage 70 (block 116).

According to some examples, the contract creator 12 may obtain the public key 40 ("e") (e.g., from the contract executor 16 or a key registry) (block 118). Similarly, in some examples, the contract creator 12 may receive the corresponding plurality of public keys 50-1-50-N ("$o_1$-$o_N$") (e.g., from the plurality of oracles 20-1-20-N) (block 120). The contract creator 12 then encrypts the plurality of symmetric keys 32-1-32-N using the public key 40 ("e") of the contract executor 16, the public key 40 ("e") corresponding to a private key 44 ("E") of the contract executor 16 (block 122). Processing then resumes at block 124 of FIG. 3B.

Turning now to FIG. 6B, the contract creator 12 next generates the plurality of envelopes 48-3B-48-3L using the corresponding plurality of public keys 50-3B-50-3L (block 124). The plurality of envelopes 48-3B-48-3L comprises the corresponding plurality of wrappers 38-3B-38-3L encrypted using the corresponding plurality of public keys 50-3B-50-3L, as well as the corresponding plurality of policies 30-3B-30-3L, each digitally authenticated and comprising the one or more conditions precedent 28-3B-28-3L. In some examples, the contract creator 12 may encrypt the plurality of envelopes 48-3B-48-3L using the public key 40 ("e") prior to deploying the smart contract 26 (block 126). This operation may be omitted in other examples, including examples in which the contract creator 12 is configured to communicate with the contract executor 16 via a secure transport protocol.

If there are additional stages, the process returns to block 114 and the process is repeated for the stages 70-2B and 70-1B. After the processing has completed for each of the three stages 70-3B, 70-2B and 70-1B, the contract creator 12 then sends the smart contract 26 to the contract executor 16 (block 128).

Figure 7:
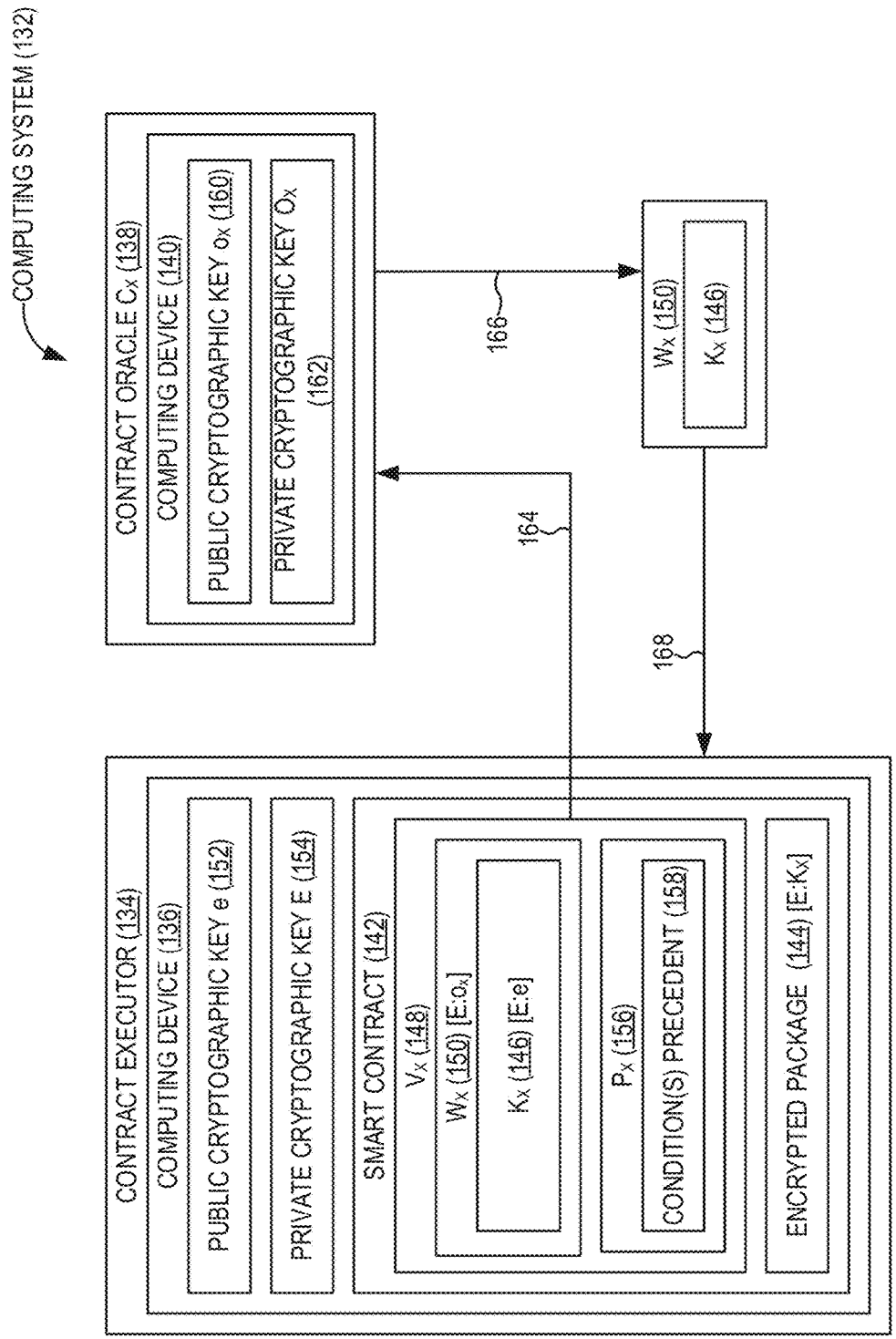
FIG. 7 is a block diagram of a computing system for illustrating interactions between a contract executor and an oracle according to one example.

FIG. 7 is a block diagram of a computing system 132 for illustrating interactions between a contract executor 134 and an oracle 138. The interactions disclosed herein between the contract executor 134 and the oracle 138 are substantially similar, or identical, to the interactions between a contract executor and an oracle in any of the Figures discussed herein. In particular, FIG. 7 illustrates how the contract executor 134 and the oracle 138 may interact in some examples to facilitate access by the contract executor 134 to an encrypted key that has been encrypted by both a public key 152 of the contract executor 134 and then by the public key 160 of the oracle 138.

The contract executor 134 includes a computing device 136. The computing device 136 is communicatively coupled to the oracle 138 ("$C_X$"), which includes a computing device 140. The contract executor 134 receives and stores a smart contract 142 that includes an encrypted package 144 comprising sensitive data encrypted using a symmetric key 146 ("$K_X$"). In some examples, the symmetric key 146 may be one of a plurality of symmetric keys (not shown) within the smart contract 142. In this example, the subscript X in the designation "$K_X$" for the symmetric key 146 indicates that the symmetric key 146 may be any one of a subset of at least size R of the plurality of symmetric keys. It is to be further understood that each element illustrated in FIG. 7 with a subscript X (e.g., "$C_X$" and the like) represents an individual element within a plurality of similar elements, and corresponds to the symmetric key 146.

As seen in FIG. 7, the smart contract 142 also includes an envelope 148 ("$V_X$") that stores an encrypted wrapper 150 ("$W_X$") in which the symmetric key 146 itself is encrypted using a public key 152 ("e") of the contract executor 134, where the public key 152 corresponds to a private key 154 ("E") of the contract executor 134. The encrypted wrapper 150 ("$W_X$") was generated by encrypting the symmetric key 146 with the public key 160 of the oracle 138. The envelope 148 additionally includes a policy 156 ("$P_X$") that comprises one or more conditions precedent 158 and that, in some examples, may be digitally authenticated.

At a point in time after deployment of the smart contract 142 to the contract executor 134, the contract executor 134 determines whether the one or more conditions precedent 158 of the policy 156 of the smart contract 142 have been satisfied. If so, the contract executor 134 transmits the envelope 148 of the smart contract 142 to the oracle 138, as indicated by arrow 164.

Upon receiving the envelope 148, the oracle 138 confirms that the condition(s) precedent 158 of the policy 156 of the smart contract 142 have been satisfied. The oracle 138 then decrypts the wrapper 150 using a private key 162, and then transmits the wrapper 150 back to the contract executor 134, as indicated by arrows 166 and 168. Note that, in some examples, the oracle 138 may opt to decrypt the wrapper 150 prior to evaluating the policy 156, rather than subsequent to evaluating the policy 156. The contract executor 134 then decrypts the symmetric key 146 of the wrapper 150 using the private key 154.

Figure 8:
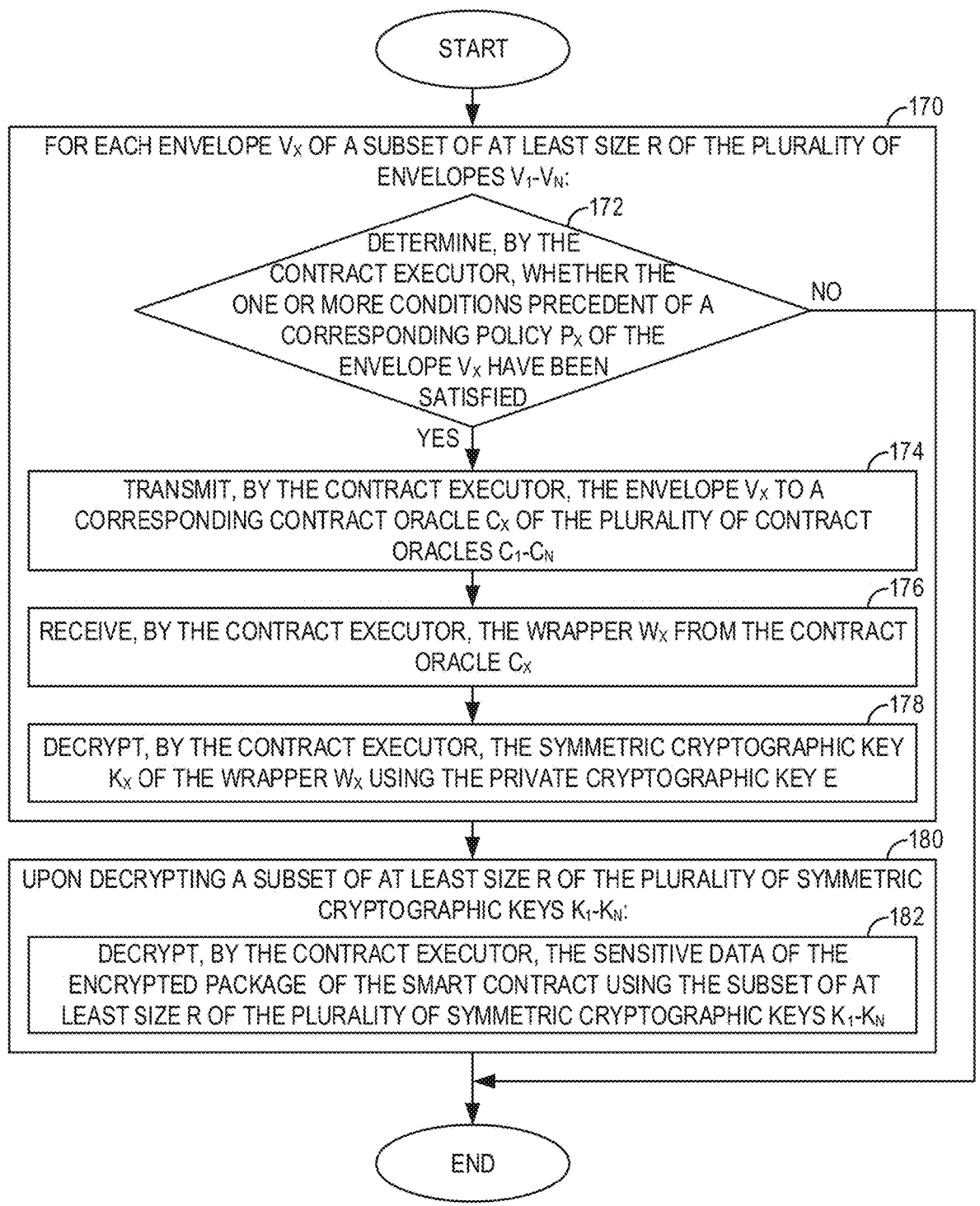
FIG. 8 is a flowchart illustrating a method for obtaining a symmetric key by a contract executor and decrypting an encrypted package according to one example.

FIG. 8 is a flowchart illustrating a method for obtaining the symmetric key 146 by the contract executor 134 and decrypting the encrypted package 144 according to one example. Elements of FIGS. 1 and 7 are referenced in describing FIG. 8 for the sake of clarity. In FIG. 8, operations begin with the contract executor 134 performing a series of operations for each envelope 148 ("$V_X$") of a subset of at least size R of a plurality of envelopes such as the envelopes 48-1-48-N of FIG. 1 ("$V_1$-$V_N$") (block 170). The contract executor 134 determines whether the one or more conditions precedent 158 of the policy 156 ("$P_X$") of the envelope 148 have been satisfied (block 172). If not, operations in FIG. 8 end. However, if the contract executor 134 determines at decision block 172 that the one or more conditions precedent 158 of the policy 156 have been satisfied, the contract executor 134 transmits the envelope 148 to the corresponding oracle 138 ("$C_X$") of a plurality of oracles such as the oracles 20-1-20-N of FIG. 1 (block 174). The contract executor 134 subsequently receives the wrapper 150 ("$W_X$") from the oracle 138 (i.e., decrypted from the envelope 148 by the oracle 138) (block 176). The contract executor 134 next decrypts the symmetric key 146 of the wrapper 150 using the private key 154 ("E") (block 178).

The operations of block 170 of FIG. 8 may be performed one or more times until a subset of at least size R of a plurality of symmetric keys $K_1$-$K_N$ (e.g., the symmetric keys 32-1-32-N) have been decrypted by the contract executor 134 (block 180). At that point, the contract executor 134 decrypts the sensitive data of the encrypted package 144 of the smart contract 142 using the subset of at least size R of the plurality of symmetric keys $K_1$-$K_N$ (block 182). If the contract executor 134 is processing the final stage of a multi-stage smart contract, the contract executor 134 then completes whatever actions were associated with the final stage of the multi-stage smart contract. Otherwise, the contract executor 134 begins to process the envelopes for the next stage of the multi-stage smart contract that are contained in the encrypted package 144.

Figure 9:
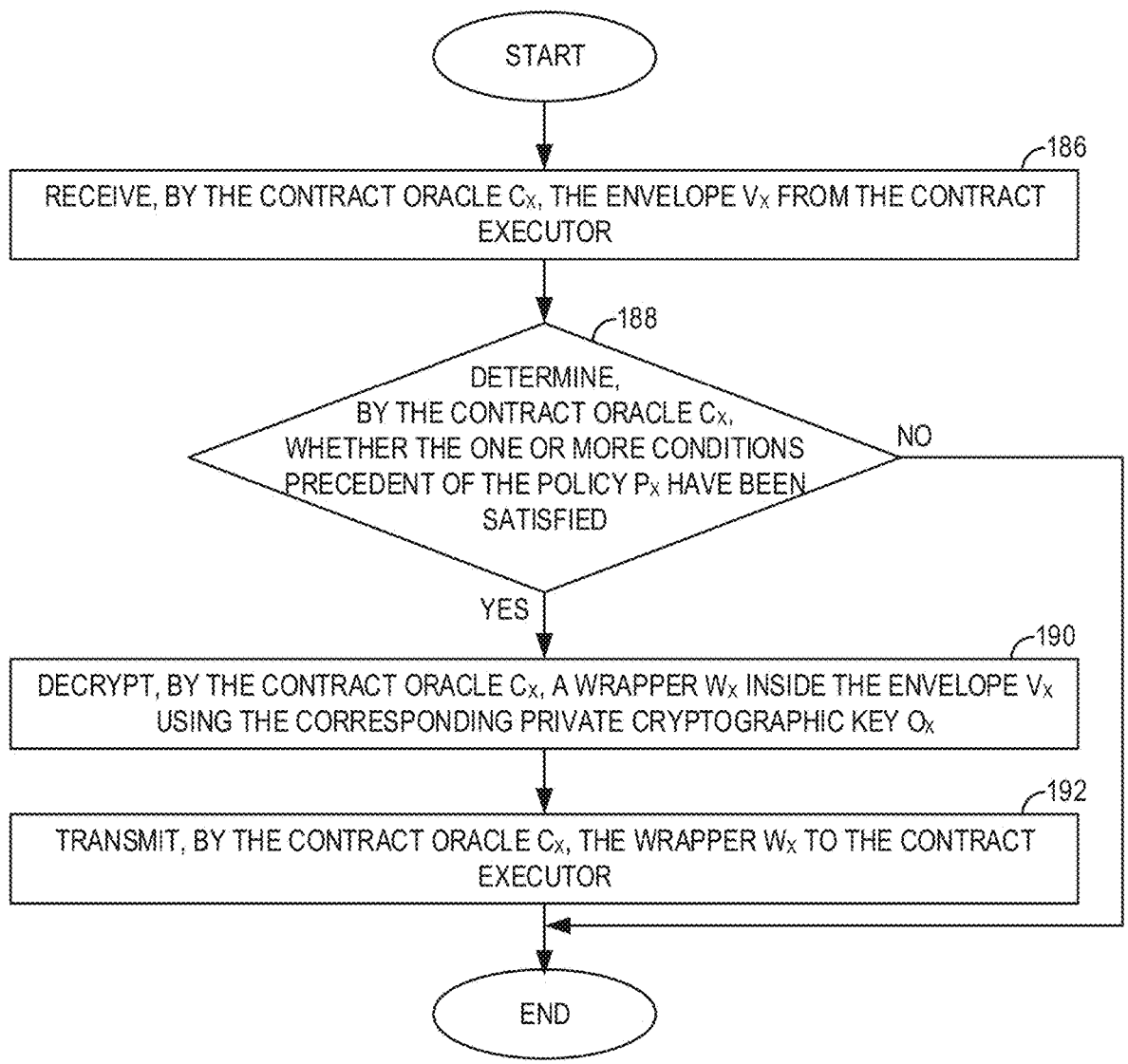
FIG. 9 is a flowchart illustrating a method for decrypting and providing a wrapper containing an encrypted key by an oracle, according to one example.

FIG. 9 is a flowchart illustrating a method for decrypting and providing the wrapper 150 containing the encrypted key 146 by the oracle 138 of FIG. 7, according to one example. For the sake of clarity, elements of FIG. 7 are referenced in describing FIG. 9. Operations in FIG. 9 begin with the oracle 138 ("$C_X$") receiving the envelope 148 ("$V_X$") from the contract executor 134 (block 186). The oracle 138 determines whether the one or more conditions precedent 158 of the policy 156 ("$P_X$") have been satisfied (block 188). If not, operations in FIG. 9 end. However, if the oracle 138 determines at decision block 188 that the one or more conditions precedent 158 of the policy 156 have been satisfied, the oracle 138 decrypts the wrapper 150 ("$W_X$") inside the envelope 148 using the private key 162 ("$O_X$") (block 190). The oracle 138 then transmits the wrapper 150 to the contract executor 134 (block 192). Note that, in some examples, the operations of blocks 188 and 190 of FIG. 9 may be performed in reverse order. Thus, in such examples, the oracle 138 may perform the operations of block 188 for determining whether the one or more conditions precedent 158 of the policy 156 have been satisfied subsequent to performing the operations of block 190 for decrypting the wrapper 150 of the envelope 148 using the private key 162.

Figure 10:
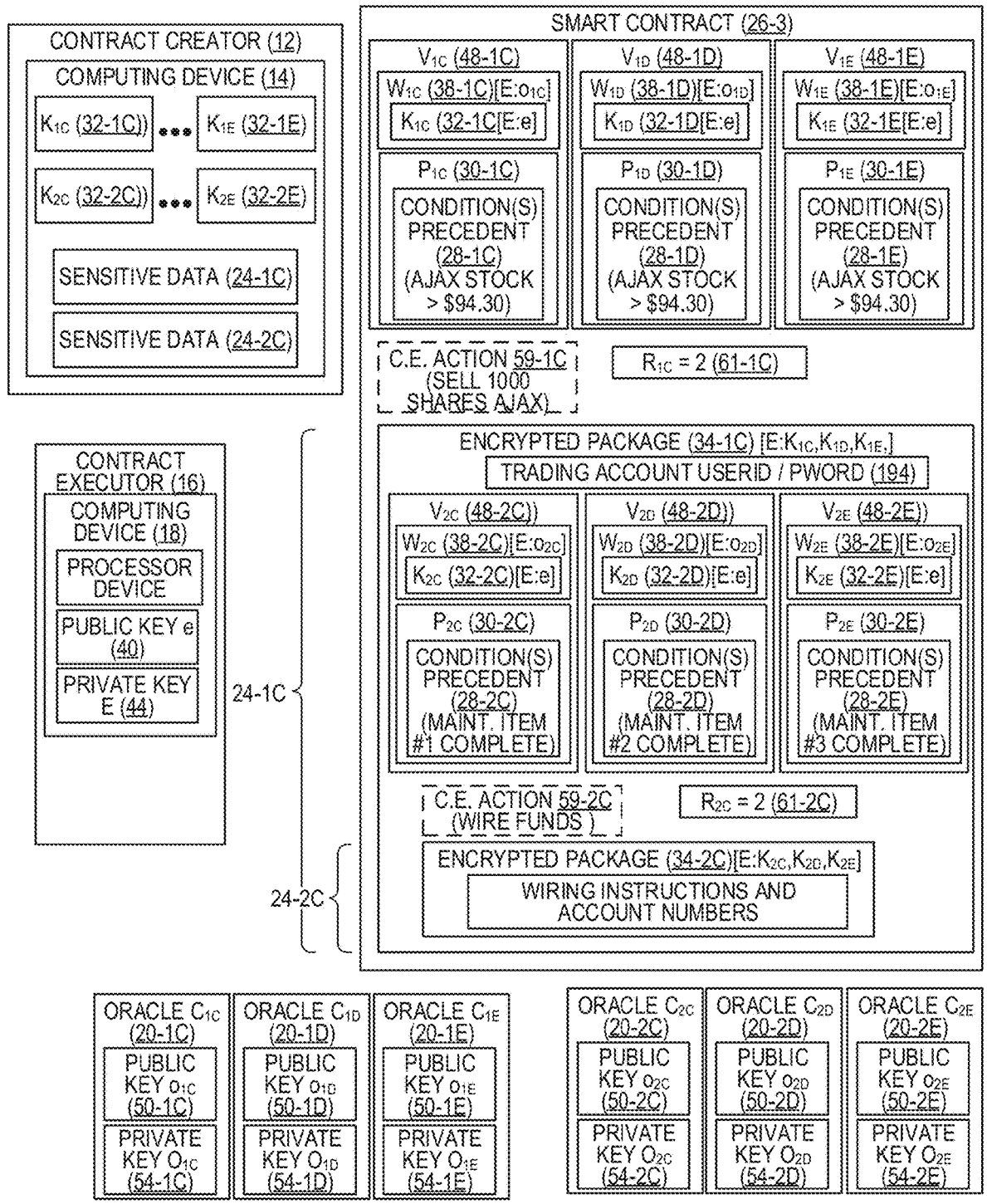
FIG. 10 is a block diagram of a computing system that illustrates an example use case of a multi-stage smart contract according to one example.

FIG. 10 is a block diagram of a computing system 10-3 that illustrates an example use case of a multi-stage smart contract. In this example, assume that a real estate purchaser wishes to sell 1000 shares of AJAX stock via a first trading account once the stock has reached a particular price. After the sale of the stock, the purchaser wishes to wire the proceeds of the sale of the stock to a seller of a home, but only if the seller has complied with at least two of three negotiated maintenance items. The completion of each maintenance item is confirmable by an oracle. The wiring of the funds should not be known to the contract executor 16 unless and until the stock is sold. In response to input that characterizes this situation and the receipt of the relevant data, the contract creator 12 generates a two-stage smart contract 26-3 to implement this sequence of events and conditions.

The contract creator 12 generates symmetric keys 32-2C-32-2E ("$K_{2C}$-$K_{2E}$"). The contract creator 12 generates sensitive data 24-2C which comprises the wiring instructions necessary for wiring funds from the purchaser to the seller. The contract creator 12 encrypts the sensitive data 24-2C using the keys 32-2C-32-2E to generate an encrypted package 34-2C. The contract creator 12 generates a policy 30-2C that identifies a condition precedent 28-2C relating to a first maintenance item of the three maintenance items. The completion of the first maintenance item is confirmable by an oracle 20-2C. The contract creator 12 encrypts the key 32-2C with the public key 40 of the contract executor 16. The contract creator 12 creates a wrapper 38-2C by encrypting the encrypted key 32-2C with the public key 50-2C of the oracle 20-2C. The contract creator 12 then generates an envelope 48-2C that includes the wrapper 38-2C and the policy 30-2C. The contract creator 12 may use the public key 50-2C of the oracle 20-2C to authenticate the envelope 48-2C and/or the policy 30-2C.

The contract creator 12 generates a policy 30-2D that identifies a condition precedent 28-2D relating to a second maintenance item of the three maintenance items. The completion of the second maintenance item is confirmable by an oracle 20-2D. The contract creator 12 encrypts the key 32-2D with the public key 40 of the contract executor 16. The contract creator 12 creates a wrapper 38-2D by encrypting the encrypted key 32-2D with the public key 50-2D of the oracle 20-2D. The contract creator 12 then generates an envelope 48-2D that includes the wrapper 38-2D and the policy 30-2D. The contract creator 12 may use the public key 50-2D of the oracle 20-2D to authenticate the envelope 48-2D and/or the policy 30-2D.

The contract creator 12 generates a policy 30-2E that identifies a condition precedent 28-2E relating to a third maintenance item of the three maintenance items. The completion of the third maintenance item is confirmable by an oracle 20-2E. The contract creator 12 encrypts the key 32-2E with the public key 40 of the contract executor 16. The contract creator 12 creates a wrapper 38-2E by encrypting the encrypted key 32-2E with the public key 50-2E of the oracle 20-2E. The contract creator 12 then generates an envelope 48-2E that includes the wrapper 38-2E and the policy 30-2E. The contract creator 12 may use the public key 50-2E of the oracle 20-2E to authenticate the envelope 48-2E and/or the policy 30-2E.

The contract creator 12 generates a trading account information 194 that includes the necessary information for the contract executor 16 to trade the AJAX stock. The contract creator 12 generates a contract executor action 59-2C that indicates that the contract executor 16 is to wire funds from the account of the seller to that of the purchaser. The contract creator 12 generates a value 61-2C ("$R_{2C}$") of two, to indicate to the contract executor 16 that at least two of the conditions precedent 28-2C-28-2E need to be met in order for the contract executor 16 to have a sufficient number of the keys 32-2C-32-2E to decrypt the encrypted package 34-2C.

The contract creator 12 generates symmetric keys 32-1C-32-1E ($K_{1C}$-$K_{1E}$). The contract creator 12 generates sensitive data 24-1C by encrypting the trading account information 194, the envelopes 48-2C-48-2E, the contract executor action 59-2C, the value 61-2C and the encrypted package 34-2C with the keys 32-2C-32-2E.

The contract creator 12 generates a policy 30-1C that identifies a condition precedent 28-1C relating to determining that the price of AJAX stock is greater than a predetermined value (e.g., $94.30). The current price of the AJAX stock is confirmable by three different oracles 20-1C-20-1E, each of which obtains current stock prices from a different external source. In this example, to ensure that the current price of the AJAX stock is greater than the predetermined value, the contract creator 12 will require that at least two of the three different oracles 20-1C-20-1E confirm that the current price of the AJAX stock is greater than the predetermined value. The contract creator 12 encrypts the key 32-1C with the public key 40 of the contract executor 16. The contract creator 12 creates a wrapper 38-1C by encrypting the encrypted key 32-1C with the public key 50-1C of the oracle 20-1C. The contract creator 12 then generates an envelope 48-1C that includes the wrapper 38-1C and the policy 30-1C. The contract creator 12 may use the public key 50-1C of the oracle 20-1C to authenticate the envelope 48-1C and/or the policy 30-1C.

The contract creator 12 generates a policy 30-1D that identifies a condition precedent 28-1D relating to determining that the price of AJAX stock is greater than the predetermined value (e.g., $94.30). The contract creator 12 encrypts the key 32-1D with the public key 40 of the contract executor 16. The contract creator 12 creates a wrapper 38-1D by encrypting the encrypted key 32-1D with the public key 50-1D of the oracle 20-1D. The contract creator 12 then generates an envelope 48-1D that includes the wrapper 38-1D and the policy 30-1D. The contract creator 12 may use the public key 50-1D of the oracle 20-1D to authenticate the envelope 48-1D and/or the policy 30-1D.

The contract creator 12 generates a policy 30-1E that identifies a condition precedent 28-1E relating to determining that the price of AJAX stock is greater than the predetermined value (e.g., $94.30). The contract creator 12 encrypts the key 32-1E with the public key 40 of the contract executor 16. The contract creator 12 creates a wrapper 38-1E by encrypting the encrypted key 32-1E with the public key 50-1E of the oracle 20-1E. The contract creator 12 then generates an envelope 48-1E that includes the wrapper 38-1E and the policy 30-1E. The contract creator 12 may use the public key 50-1E of the oracle 20-1E to authenticate the envelope 48-1E and/or the policy 30-1E.

The contract creator generates a contract executor action 59-1C that indicates that the contract executor 16 is to sell 1000 shares of AJAX stock. The contract creator 12 generates a value 61-1C ("$R_{1C}$") of two, to indicate to the contract executor 16 that at least two of the conditions precedent 28-1C-28-1E need to be met (i.e., needs at least two confirmations that the current price of AJAX stock is greater than $1000) in order for the contract executor 16 to have a sufficient number of the keys 32-1C-32-1E to decrypt the encrypted package 34-1C.

The contract creator 12 then sends the multi-stage smart contract to the contract executor 16. The contract executor 16 analyzes the conditions precedent 28-1C-28-1E. At some point in time, the contract executor 16 determines that the price of the AJAX stock is greater than the predetermined price. This may occur via some external data source, or through interactions with one or more of the oracles 20-1C-

20-1E. For example, the contract executor 16 may periodically poll the oracle 20-1C requesting the current price of the AJAX stock. Upon being informed that the price of the AJAX stock is greater than the predetermined value, the contract executor 16 may send each of the oracles 20-1C-20-1E a corresponding envelope 48-1C-48-1E. Assume that at least two of the oracles 20-1C-20-1E confirm that the current price of the AJAX stock is greater than the predetermined value, and in response, decrypt the corresponding wrappers 38-1C-38-1E and provide the encrypted keys 32-1C-32-1E to the contract executor 16. The contract executor 16 decrypts at least two of the encrypted keys 32-1C-32-1E and decrypts the encrypted package 34-1C. The contract executor 16 uses the trading information 194 to sell 1000 shares of AJAX stock.

The contract executor 16 analyzes the conditions precedent 28-2C-28-2E. The contract executor 16 may periodically poll the oracles 20-2C-20-2E to determine whether the corresponding conditions precedent 28-2C-28-2E have been met. Upon receiving an indication by one of the oracles 20-2C-20-2E that the corresponding maintenance item has been performed, the contract executor 16 may send the respective one of the oracles 20-2C-20-2E the corresponding envelope 48-2C-48-2E in order to obtain access to the corresponding encrypted key 32-2C-32-2E. In some examples, the oracles 20-2C-20-2E may simply be provided the corresponding envelope 48-2C-48-2E, and upon confirmation by the oracles 20-2C-20-2E of the performance of the corresponding maintenance item, may then automatically decrypt the corresponding wrapper 38-2C-38-2E and send the corresponding encrypted key 32-2C-32-2E to the contract executor 16. After receiving at least two such encrypted keys 32-2C-32-2E, the contract executor 16 decrypts the at least two such encrypted keys 32-1C-32-1E and decrypts the encrypted package 34-2C. The contract executor 16 uses the wiring instructions contained in the encrypted package 34-2C to wire the funds from the sale of the AJAX stock to the seller.

Figure 11:
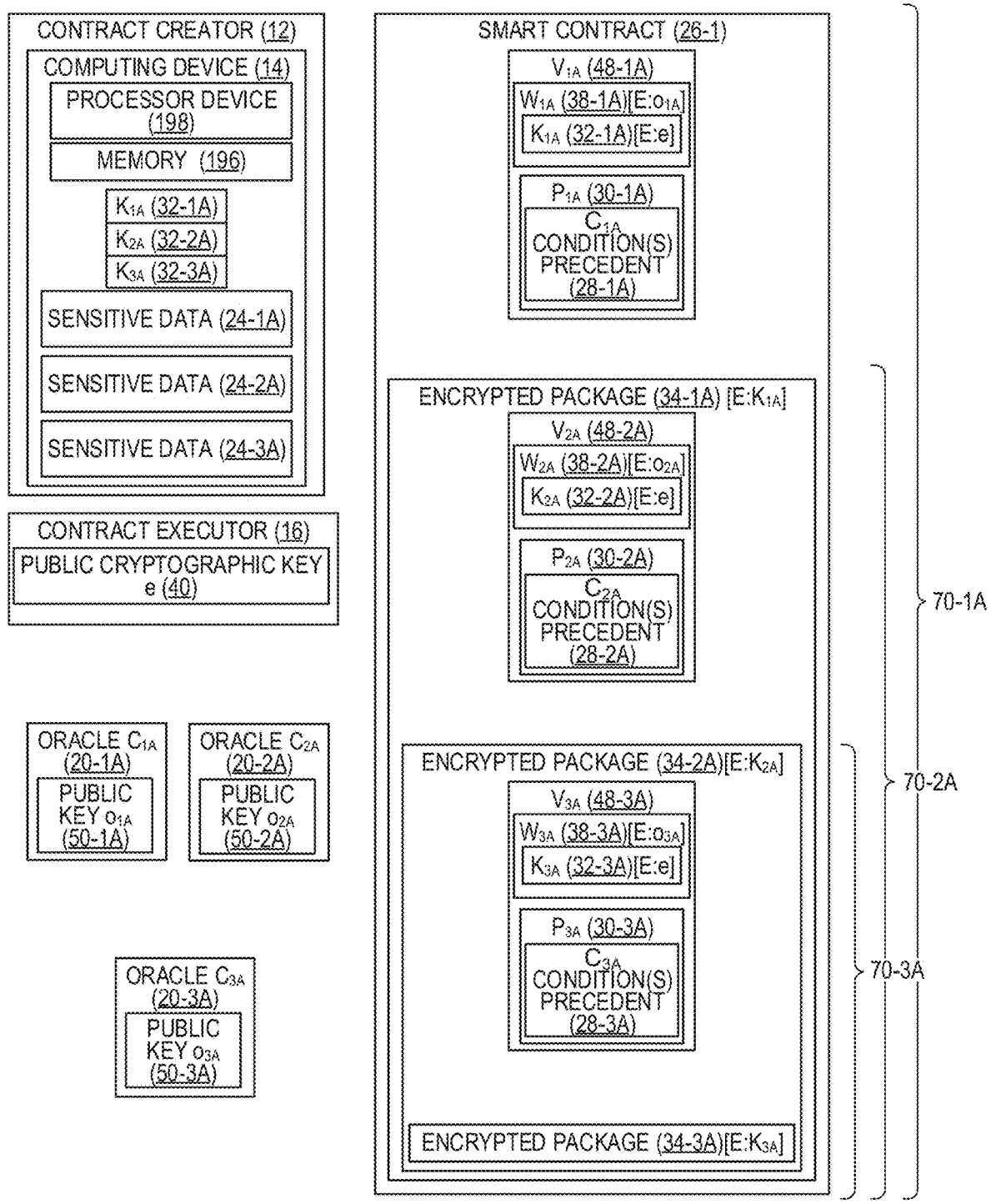
FIG. 11 is a simplified block diagram of the computing system illustrated in FIG. 2 according to one example.

FIG. 11 is a simplified block diagram of the computing system 10-1 illustrated in FIG. 2 according to one example. The computing system 10-1 includes the computing device 14 which includes a memory 196 and a processor device 198 coupled to the memory 196. The processor device is to generate the smart contract 26-1 that is to be performed by the contract executor 16 in the plurality of successive stages 70. For each respective stage 70 of at least some of the stages 70, the processor device 198 is to encrypt a package of data, such as the sensitive data 24, with at least one key 32 to generate an encrypted package 34 that corresponds to the respective stage 70. The processor device 198 is further to generate an envelope 48 that corresponds to the respective stage 70, the envelope 48 comprising a condition precedent 28 confirmable by an oracle 20. The envelope 48 also includes an encrypted package-decryption key K that is encrypted with the key 40 of the contract executor 16, the encrypted package-decryption key K, when decrypted, being configured to facilitate the decryption of the encrypted package 34 that corresponds to the respective stage 70, wherein the encrypted package 34 for at least some of the stages 70 comprises the envelope 70 and an encrypted package 34 that corresponds to a next successive stage 70. The processor device 198 is to send the smart contract 26-1 to the contract executor 16.

Figure 12:
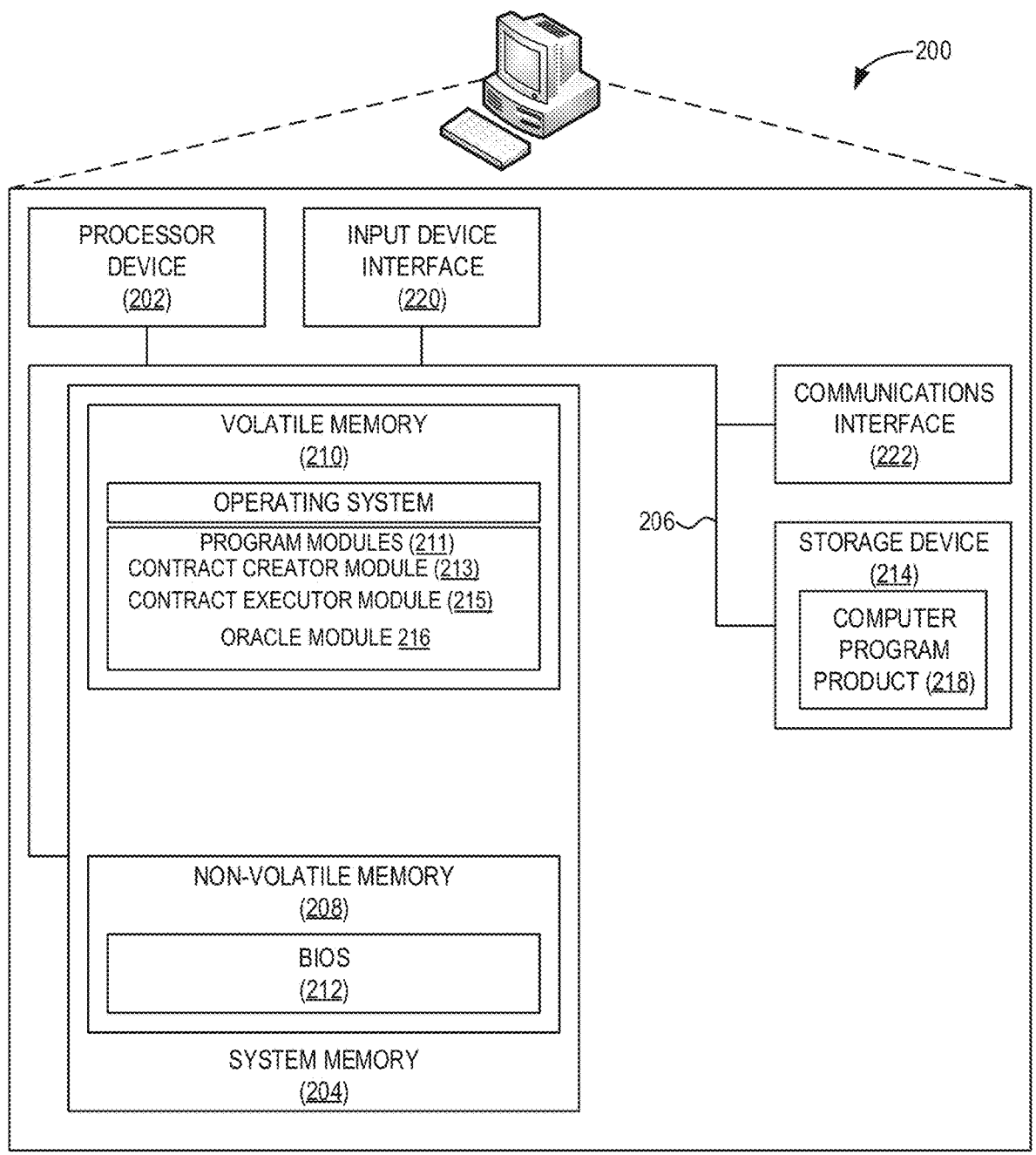
FIG. 12 is a block diagram of a computing device suitable for implementing examples, according to one example.

FIG. 12 is a block diagram of a processor-based computing device 200 ("computing device 200"), such as the computing device 14, the computing device 18, or the computing devices 22-1-22-N of FIG. 1, suitable for implementing examples according to one example. The computing device 200 may comprise any computing or electronic device capable of including firmware, hardware, and/or executing software instructions to implement the functionality described herein, such as a computer server, a desktop computing device, a laptop computing device, or the like. The computing device 200 includes a processor device 202, a system memory 204, and a system bus 206. The system bus 206 provides an interface for system components including, but not limited to, the system memory 204 and the processor device 202. The processor device 202 can be any commercially available or proprietary processor.

The system bus 206 may be any of several types of bus structures that may further interconnect to a memory bus (with or without a memory controller), a peripheral bus, and/or a local bus using any of a variety of commercially available bus architectures. The system memory 204 may include non-volatile memory 208 (e.g., read-only memory (ROM), erasable programmable ROM (EPROM), electrically EPROM (EEPROM), etc.), and volatile memory 210 (e.g., RAM). A basic input/output system (BIOS) 212 may be stored in the non-volatile memory 208 and can include the basic routines that help to transfer information among elements within the computing device 200. The volatile memory 210 may also include a high-speed RAM, such as static RAM, for caching data.

The computing device 200 may further include or be coupled to a non-transitory computer-readable storage medium such as a storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 214 and in the volatile memory 210, including an operating system and one or more program modules 211 which may implement the functionality described herein in whole or in part. For example, a contract creator module 213 may comprise programming instructions that implement the functionality described herein with regard to the contract creator 12. A contract executor module 215 may comprise programming instructions that implement the functionality described herein with regard to the contract executor 16. An oracle module 216 may comprise programming instructions that implement the functionality described herein with regard to any of the oracles 20 disclosed herein. All or a portion of the examples may be implemented as a computer program product 218 stored on a transitory or non-transitory computer-usable or computer-readable storage medium, such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed on the processor device 202. The processor device 202 may serve as a controller, or control system, for the computing device 200 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 202 through an input device interface 220 that is coupled to the system bus 206 but can be connected by other interfaces, such as a parallel port, an Institute of Electrical and Electronic Engineers (IEEE) 1394 serial port, a Universal Serial Bus (USB) port, an IR interface, and the like. The computing device 200 may also include a communications interface 222 suitable for communicating with a network as appropriate or desired.

Individuals will recognize improvements and modifications to the preferred examples of the disclosure. All such improvements and modifications are considered within the scope of the concepts disclosed herein and the claims that follow The examples also facilitate an improvement to computer functionality itself via the enabling of sensitive data to be incorporated directly into smart contracts in encrypted form using encryption keys provided by oracles, and further to be decrypted by a contract executor using decryption keys provided by oracles. Thus, the examples are directed to specific improvements in computer functionality.

What is claimed is:

1. A method comprising:
    generating, by a computing device comprising a processor device, a smart contract that is to be performed by a contract executor in a plurality of successive stages, by, for each respective stage of at least some stages:
        encrypting a package of data with at least one key to generate an encrypted package that corresponds to the respective stage; and
        generating an envelope that corresponds to the respective stage, the envelope comprising:
            a condition precedent confirmable by an oracle; and
            an encrypted package-decryption key that is encrypted with a key of the contract executor, the encrypted package-decryption key, when decrypted, being configured to facilitate the decryption of the encrypted package that corresponds to the respective stage,
        wherein the encrypted package for at least some of the stages comprises an envelope and an encrypted package that corresponds to a next successive stage; and
    sending the smart contract to the contract executor.

2. The method of claim 1 wherein, for at least one stage, generating the envelope further comprises generating an encrypted wrapper by encrypting the encrypted package-decryption key with a public key of the oracle that is to confirm the condition precedent.

3. The method of claim 1 further comprising, for at least one stage of the plurality of stages, generating a set of envelopes, each envelope in the set comprising:
    a corresponding condition precedent confirmable by a corresponding oracle of a plurality of oracles; and
    a corresponding encrypted package-decryption key that is encrypted with a key of the contract executor, the corresponding encrypted package-decryption key being a different key than any other encrypted package-decryption key in any other envelope in the set of envelopes, at least two package-decryption keys from different envelopes in the set of envelopes being required to decrypt the encrypted package of the at least one stage.

4. The method of claim 3 wherein generating the set of envelopes in the at least one stage further comprises, for each envelope, generating an encrypted wrapper by encrypting the corresponding encrypted package-decryption key with a public key of the corresponding oracle that is to confirm the condition precedent.

5. The method of claim 3 wherein the package-decryption key from each envelope of the set of envelopes is required to decrypt the encrypted package of the at least one stage.

6. The method of claim 3 wherein, for the at least one stage of the plurality of stages, generating the set of envelopes comprises, for each stage of the plurality of stages, generating the set of envelopes.

7. The method of claim 3 further comprising inserting, in the smart contract, a key value that identifies a number of package-decryption keys that are needed to decrypt the encrypted package of the at least one stage.

8. The method of claim 1 wherein the plurality of stages comprises at least three stages.

9. The method of claim 1 wherein for each stage of the plurality of stages a corresponding encrypted package is generated, and the encrypted package that corresponds to each stage except for a final stage comprises the envelope that corresponds to a next successive stage of the plurality of stages.

10. The method of claim 1 further comprising inserting, in the smart contract, for at least one stage, a contract executor action that identifies an action to be performed by the contract executor.

11. The method of claim 1 further comprising:
    receiving, by the contract executor executing on a computing device comprising a processor device, the smart contract;
    accessing an envelope that corresponds to a first stage, the envelope comprising a first stage condition precedent confirmable by an oracle, and a first stage encrypted package-decryption key that is encrypted with a key of the contract executor, the first stage encrypted package-decryption key, when decrypted, being configured to facilitate the decryption of a first stage encrypted package of the smart contract that corresponds to the first stage;
    sending a message to the oracle that includes the first stage condition precedent confirmable by the oracle;
    receiving a confirmation from the oracle that the first stage condition precedent has been met;
    in response to receiving the confirmation, decrypting, using a private key of the contract executor, the first stage encrypted package-decryption key to generate a first stage decrypted package-decryption key;
    decrypting, using the first stage decrypted package-decryption key, the first stage encrypted package to generate a first stage decrypted package, the first stage decrypted package including a second stage envelope and a second stage encrypted package that corresponds to a second stage of the plurality of stages.

12. The method of claim 1 further comprising:
    receiving, by the contract executor executing on a computing device comprising a processor device, the smart contract;
    accessing an envelope that corresponds to a first stage, the envelope comprising a first stage condition precedent confirmable by an oracle, and a first stage encrypted package-decryption key that is encrypted with a key of the contract executor, the first stage encrypted package-decryption key, when decrypted, being configured to facilitate the decryption of a first stage encrypted package of the smart contract that corresponds to the first stage;
sending a message to the oracle that includes the first stage condition precedent confirmable by the oracle;
receiving a confirmation from the oracle that the first stage condition precedent has been met;
in response to receiving the confirmation, performing a contract executor action identified in the smart contract;
subsequent to receiving the confirmation, decrypting, using a private key of the contract executor, the first stage encrypted package-decryption key to generate a first stage decrypted package-decryption key; and
decrypting, using the first stage decrypted package-decryption key, the first stage encrypted package to generate a first stage decrypted package, the first stage decrypted package including a second stage envelope and a second stage encrypted package that corresponds to a second stage of the plurality of stages.

13. The method of claim 1 further comprising:
receiving, by the contract executor executing on a computing device comprising a processor device, the smart contract;
accessing an envelope that corresponds to a first stage, the envelope comprising a first stage condition precedent confirmable by a respective oracle of a plurality of oracles, and a first stage encrypted wrapper encrypted by a public key of the respective oracle, the first stage encrypted wrapper containing a first stage encrypted package-decryption key that is encrypted with a key of the contract executor, the first stage encrypted package-decryption key, when decrypted, being configured to facilitate the decryption of a first stage encrypted package of the smart contract that corresponds to the first stage;
determining the respective oracle that is to confirm the first stage condition precedent;
sending a message to the respective oracle that includes the first stage condition precedent confirmable by the respective oracle and the first stage encrypted wrapper;
receiving a confirmation from the respective oracle that the first stage condition precedent has been met and a first stage decrypted wrapper that comprises the first stage encrypted package-decryption key;
accessing the first stage encrypted package-decryption key;
decrypting, using a private key of the contract executor, the first stage encrypted package-decryption key to generate a first stage decrypted package-decryption key; and
decrypting, using the first stage decrypted package-decryption key, the first stage encrypted package to generate a first stage decrypted package, the first stage decrypted package including a second stage envelope and a second stage encrypted package that corresponds to a second stage of the plurality of stages.

14. The method of claim 1 further comprising:
receiving, by the contract executor executing on a computing device comprising a processor device, the smart contract;
accessing a set of first stage envelopes that correspond to a first stage, each first stage envelope comprising a respective first stage condition precedent confirmable by a respective oracle of a plurality of oracles;
for each of at least two respective first stage envelopes in the set of first stage envelopes:
determining the respective oracle that is to confirm the first stage condition precedent of the respective first stage envelope;
accessing a first stage encrypted wrapper encrypted by a public key of the respective oracle, the first stage encrypted wrapper containing a first stage encrypted package-decryption key that is encrypted with the key of the contract executor;
sending a message to the respective oracle that includes the respective first stage condition precedent and the first stage encrypted wrapper;
receiving a confirmation from the respective oracle that the respective first stage condition precedent has been met and a first stage decrypted wrapper that comprises the first stage encrypted package-decryption key; and
accessing the first stage encrypted package-decryption key;
decrypting, using a private key of the contract executor, the first stage encrypted package-decryption key from each of the at least two first stage envelopes to generate at least two first stage decrypted package-decryption keys; and
decrypting, using the at least two first stage package-decryption keys, a first stage encrypted package to generate a first stage decrypted package, the first stage decrypted package including a second stage envelope and a second stage encrypted package that corresponds to a second stage of the plurality of stages.

15. A computing system comprising:
a first computing device comprising a first memory and a first processor device coupled to the first memory, the first processor device to:
generate a smart contract that is to be performed by a contract executor in a plurality of successive stages, the first processor device, for each respective stage of at least some stages, to:
encrypt a package of data with at least one key to generate an encrypted package that corresponds to the respective stage; and
generate an envelope that corresponds to the respective stage, the envelope comprising:
a condition precedent confirmable by an oracle; and
an encrypted package-decryption key that is encrypted with a key of the contract executor, the encrypted package-decryption key, when decrypted, being configured to facilitate the decryption of the encrypted package that corresponds to the respective stage,
wherein the encrypted package for at least some of the stages comprises an envelope and an encrypted package that corresponds to a next successive stage; and
send the smart contract to the contract executor.

16. The computing system of claim 15 wherein, for at least one stage, to generate the envelope the first processor device is further to generate an encrypted wrapper by encrypting the encrypted package-decryption key with a public key of the oracle that is to confirm the condition precedent.

17. The computing system of claim 15 wherein the first processor is further to, for at least one stage of the plurality of stages, generate a set of envelopes, each envelope in the set comprising:
a corresponding condition precedent confirmable by a corresponding oracle of a plurality of oracles; and a corresponding encrypted package-decryption key that is encrypted with a key of the contract executor, the corresponding encrypted package-decryption key being a different key than any other encrypted package-decryption key in any other envelope in the set of envelopes, at least two package-decryption keys from different envelopes in the set of envelopes being required to decrypt the encrypted package of the at least one stage.

18. The computing system of claim 15 further comprising:

an electronic contract executor comprising a second computing device comprising a second memory and a second processor device coupled to the second memory, the second processor to:

receive the smart contract;

accessing an envelope that corresponds to a first stage;

send a message to the oracle that includes the first stage condition precedent confirmable by the oracle;

receive a confirmation from the oracle that the first stage condition precedent has been met;

in response to receiving the confirmation, decrypt, using a private key of the contract executor, the first stage encrypted package-decryption key to generate a first stage decrypted package-decryption key; and decrypt, using the first stage decrypted package-decryption key, the first stage encrypted package to generate a first stage decrypted package, the first stage decrypted package including a second stage envelope and second stage encrypted package that corresponds to a second stage of the plurality of stages.

19. A computer program product stored on a non-transitory computer-readable storage medium and including instructions configured to cause a processor device to:

generate a smart contract that is to be performed by a contract executor in a plurality of successive stages, the processor device, for each respective stage of at least some stages, to:

encrypt a package of data with at least one key to generate an encrypted package that corresponds to the respective stage; and generate an envelope that corresponds to the respective stage, the envelope comprising:

a condition precedent confirmable by an oracle; and an encrypted package-decryption key that is encrypted with a key of the contract executor, the encrypted package-decryption key, when decrypted, being configured to facilitate the decryption of the encrypted package that corresponds to the respective stage, wherein the encrypted package for at least some of the stages comprises an envelope and an encrypted package that corresponds to a next successive stage; and send the smart contract to the contract executor.

20. The computer program product of claim 19 wherein, for at least one stage, to generate the envelope, the processor device is further to generate an encrypted wrapper by encrypting the encrypted package-decryption key with a public key of the oracle that is to confirm the condition precedent.

* * * * *